US012627844B2

(12) United States Patent
Burkhart et al.

(10) Patent No.: US 12,627,844 B2
(45) Date of Patent: May 12, 2026

(54) VIDEO-BASED ANALYTICS PLATFORM FOR REAL-TIME TRACKING OF ATHLETE AND EQUIPMENT MOVEMENT

(71) Applicants:Robert Bradley Burkhart, Agoura Hills, CA (US); Peter Christian Maurer, Sherman Oaks, CA (US); Edmond DeFrank, Northridge, CA (US)

(72) Inventors: Robert Bradley Burkhart, Agoura Hills, CA (US); Peter Christian Maurer, Sherman Oaks, CA (US); Edmond DeFrank, Northridge, CA (US)

( * ) Notice: Subject to any disclaimer, the term of this patent is extended or adjusted under 35 U.S.C. 154(b) by 0 days.

(21) Appl. No.: 19/351,834

(22) Filed: Oct. 7, 2025

(65) Prior Publication Data

US 2026/0039885 A1     Feb. 5, 2026

Related U.S. Application Data

(63) Continuation-in-part of application No. 19/206,875, filed on May 13, 2025, now Pat. No. 12,439,098, which is a continuation of application No. 18/761,276, filed on Jul. 1, 2024, now Pat. No. 12,301,892, which is a continuation of application No. 18/401,487, filed on Dec. 30, 2023, now Pat. No.

(Continued)

(51) Int. Cl.
| | |
|---|---|
| *H04N 21/2187* | (2011.01) |
| *H04N 7/18* | (2006.01) |
| *H04N 21/218* | (2011.01) |
| *H04N 21/81* | (2011.01) |
| *H04N 21/8549* | (2011.01) |

(52) U.S. Cl.
CPC ....... *H04N 21/21805* (2013.01); *H04N 7/181* (2013.01); *H04N 21/2187* (2013.01); *H04N 21/812* (2013.01); *H04N 21/8549* (2013.01)

(58) Field of Classification Search
CPC ............. H04N 21/21805; H04N 7/181; H04N 21/2187; H04N 21/812; H04N 21/8549
See application file for complete search history.

(56) References Cited

U.S. PATENT DOCUMENTS

| | | | |
|---|---|---|---|
| 9,999,825 B2 * | 6/2018 | Shachar | ................. G06V 20/42 |
| 2018/0152736 A1 * | 5/2018 | Alexander | ......... H04N 21/4223 |

(Continued)

*Primary Examiner* — Jae N Noh
(74) *Attorney, Agent, or Firm* — Edmond DeFrank

(57) ABSTRACT

The embodiments disclose a multi-camera live-streaming system including a plurality of synchronized capture devices configured to transmit live video data to a network server executing artificial-intelligence-based analytics that identify, segment, and classify discrete moments of athletic activity in real time, the network server further including a predictive analytics module coupled to an event-segmentation subsystem and a historical-footage database configured to employ neural-network models trained on prior gameplay to forecast probable upcoming actions and generate contextual playback recommendations synchronized with a live broadcast, wherein viewer devices coupled to the server display the resulting live stream with integrated highlight replays, adaptive advertisements, and automated camera prioritization providing real-time interactive viewing and monetization functions according to one embodiment.

20 Claims, 19 Drawing Sheets

Related U.S. Application Data 12,028,557, which is a continuation of application No. 18/208,368, filed on Jun. 12, 2023, now Pat. No. 11,863,800, which is a continuation of application No. 17/977,998, filed on Oct. 31, 2022, now Pat. No. 11,677,990, which is a continuation of application No. 17/374,874, filed on Jul. 13, 2021, now Pat. No. 11,490,130, which is a continuation of application No. 16/199,175, filed on Nov. 24, 2018, now Pat. No. 11,064,221.

(56) References Cited

U.S. PATENT DOCUMENTS

| | | | | |
|---|---|---|---|---|
| 2019/0299073 A1 * | 10/2019 | Vollbrecht | ............. | G06V 20/52 |
| 2020/0114240 A1 * | 4/2020 | Shachar | ................. | G06T 7/292 |

* cited by examiner

VIDEO-BASED ANALYTICS PLATFORM FOR REAL-TIME TRACKING OF ATHLETE AND EQUIPMENT MOVEMENT

CROSS-REFERENCE TO RELATED APPLICATIONS

This Patent Application is a Continuation-in-part and claims priority to United States Patent Application entitled: "VIDEO-BASED ANALYTICS PLATFORM FOR REAL-TIME TRACKING OF ATHLETE AND EQUIPMENT MOVEMENT", U.S. Ser. No. 1 19/206,875 filed on May 13, 2025 by Robert Bradley Burkhart, which is a Continuation of and claims priority to United States Patent Application entitled: "MULTI-CAMERA LIVE-STREAMING METHOD AND DEVICES", U.S. Ser. No. 18/761,276 filed on Jul. 1, 2024 filed by Robert Bradley Burkhart, which is a Continuation of and claims priority to United States Patent Application entitled: "MULTI-CAMERA LIVE-STREAM-ING METHOD AND DEVICES", U.S. Ser. No. 18/401,487 filed on Dec. 30, 2023 filed by Robert Bradley Burkhart, which is a Continuation of and claims priority to United States Patent Application entitled: "MULTI-CAMERA LIVE-STREAMING METHOD AND DEVICES", U.S. Ser. No. 18/208,368 filed on Jun. 12, 2023 filed by Robert Bradley Burkhart, which is a Continuation of and claims priority to United States Patent Application entitled: "MULTI-CAMERA LIVE-STREAMING METHOD AND DEVICES", U.S. Ser. No. 17/977,998 filed on Oct. 31, 2022 filed by Robert Bradley Burkhart U.S. Pat. No. 11,677,990 issued on Jun. 13, 2023, which is a Continuation of and claims priority to United States Patent Application entitled: "MULTI-CAMERA LIVE-STREAMING METHOD AND DEVICES", U.S. Ser. No. 17/374,874 filed on Oct. 31, 2022 filed by Robert Bradley Burkhart U.S. Pat. No. 11,490,130 issued on Nov. 1, 2022, which is a Continuation of and claims priority to United States Patent Application entitled: "MULTI-CAMERA LIVE-STREAMING METHOD AND DEVICES", U.S. Ser. No. 16/199,175 filed on Nov. 24, 2018 filed by Robert Bradley Burkhart U.S. Pat. No. 11,064,221 issued on Jul. 13, 2021, all of the above cases being incorporated herein by reference.

BACKGROUND

Youth sports are an enormous untapped market for origi-nal content. Every parent wants to capture their kids' game on video. Coaches and players want video too. But it is not easy with a single camera, usually far away from the action. A single camera does not offer the best experience for events, especially sports. Multi-cam emulates what we all expect from watching sports on TV.

BRIEF DESCRIPTION OF THE DRAWINGS

FIG. 7B shows for illustrative purposes only an example of second camera live-streaming auto action prioritizing of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

It should be noted that the descriptions that follow, for example, in terms of multi-camera live-streaming method and devices, are described for illustrative purposes, and the underlying system can apply to any number and multiple types of sporting events. In one embodiment of the present invention, the multi-camera live-streaming method and devices can be configured using an electronic application to record and access multi-camera sports video. The multi-camera live-streaming method and devices can be configured to include ground-level video cameras and can be configured to include drone-mounted video cameras to capture aerial footage using the present invention.

The term "multi-camera live-streaming method and devices" can be referred to herein as "VIDGO" and/or "mobile application," "mobile app," "VIDGO APP" without any change in meaning. The descriptions herein make reference to football as a game and piece of sports equipment, but any sport and corresponding piece of sports equipment can be substituted without changing any meanings or interpretations of the embodiments, with obvious context exceptions, for example, people pass a football but throw a baseball.

Figure 1:
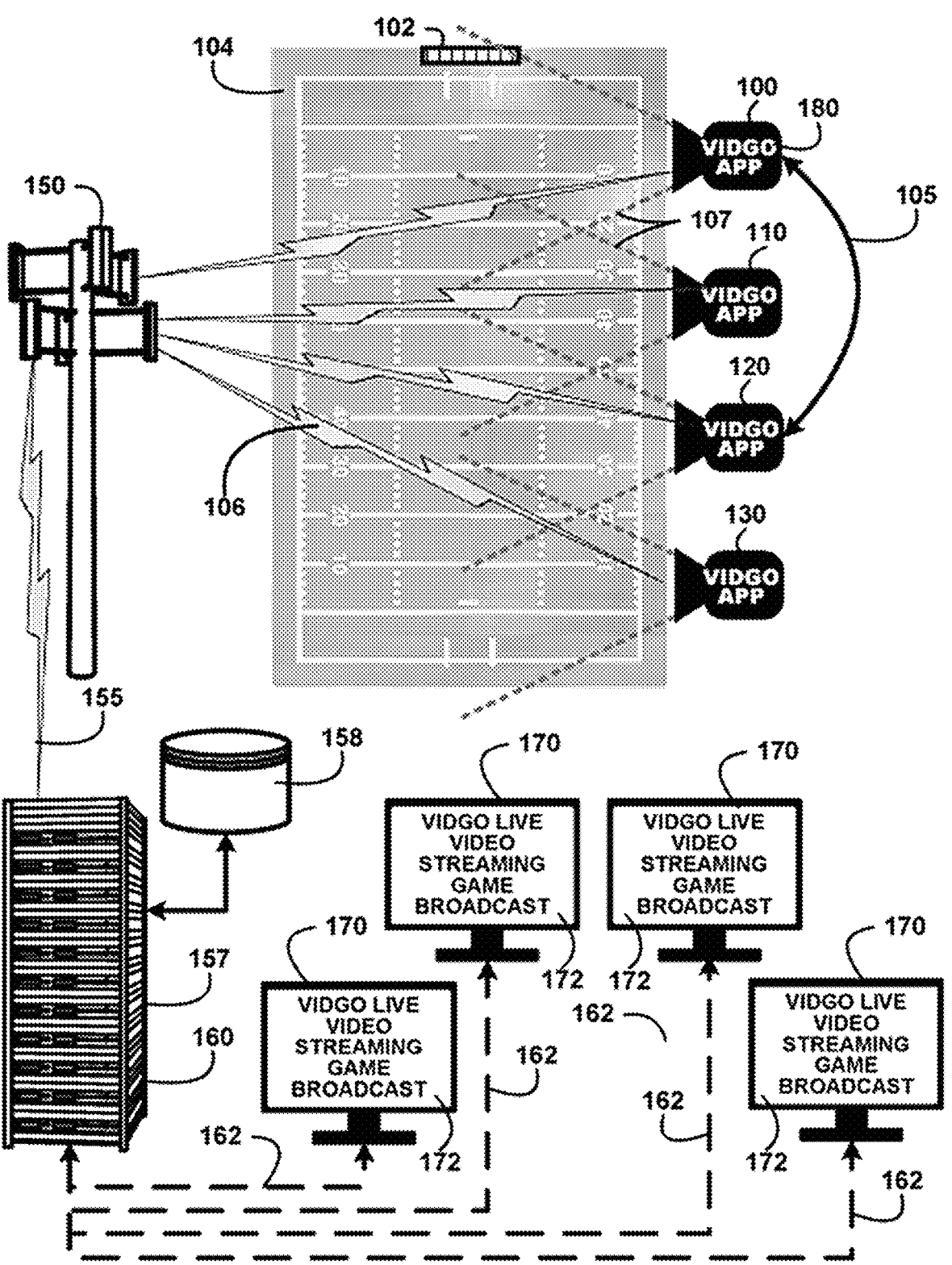
FIG. 1 shows for illustrative purposes only an example of an overview of a multi-camera live-streaming method and devices of one embodiment.

FIG. 1 illustrates, for example purposes only, an overview of a multi-camera live-streaming system and method according to one embodiment. FIG. 1 depicts a sports venue, such as a high school football field 104. Positioned along one side of the football field 104 are a plurality of cameras 107 having partially overlapping fields of view. The cameras may include, for example, handheld devices, smartphones, or professional-grade, high-speed imaging systems capable of frame-accurate synchronization. A first camera 100, operating a VIDGO app 180 or equivalent capture software, includes within its field of view a scoreboard 102.

Progressing along the sideline are additional cameras 110, 120, and 130, each likewise executing the VIDGO app 180 or compatible software capable of real-time encoding and transmission. Each camera generates a live cellular or broadband transmission 106 representing video data captured during gameplay. The cameras may continue to perform local functions (such as image buffering or user communications) while maintaining uninterrupted video capture. During live streaming, operators of the VIDGO app 180 can exchange short-range signals or "pings" 105 using an assigned unique identifier to coordinate camera angles or indicate changes in play direction. This enables coordinated, time-aligned multi-camera coverage in real time across various camera types and communication links, according to one embodiment.

Each video transmission 106 generated by the cameras 100, 110, 120, and 130 is received by one or more cellular towers 150 or broadband access points and relayed as uplink transmissions 155 to a VIDGO network server 157. The network server 157 records the incoming video data in at least one database 158 for immediate or deferred analysis, replay, and synchronization. Within the VIDGO network server 157, the multiple video feeds are time-aligned and processed by an analytics pipeline that may include AI-based synchronization, scene segmentation, and quality correction. The resulting synchronized live stream is transmitted through an internet signal transmitter 160 and distributed over an internet signal path 162 through commercial communication networks. A composite VIDGO live video streaming game broadcast 172 can then be accessed by a plurality of digital devices executing the VIDGO app 180 or compatible playback software. Each subscribed viewer device 170 can receive one or more synchronized streams from the VIDGO network server 157 for live or on-demand viewing.

A subscribed viewer using a device 170 with the VIDGO app 180 can simultaneously view multiple camera feeds of the VIDGO live video streaming game broadcast 172, displayed in a split-screen or multi-view configuration, and may select a single feed showing the primary action on the field. In addition to live gameplay, interviews, commentary, and other intermission content may be captured and streamed using the same multi-camera network. The VIDGO app 180 or equivalent playback software allows the recorded footage stored in the database 158 of the VIDGO network server 157 to be replayed with variable playback speeds, including frame-by-frame and slow-motion review. Captured content can be securely shared among authorized VIDGO subscribers, such as parents, coaches, recruiters, or professional scouts, thereby enabling both community engagement and professional-level performance analysis.

Figure 2:
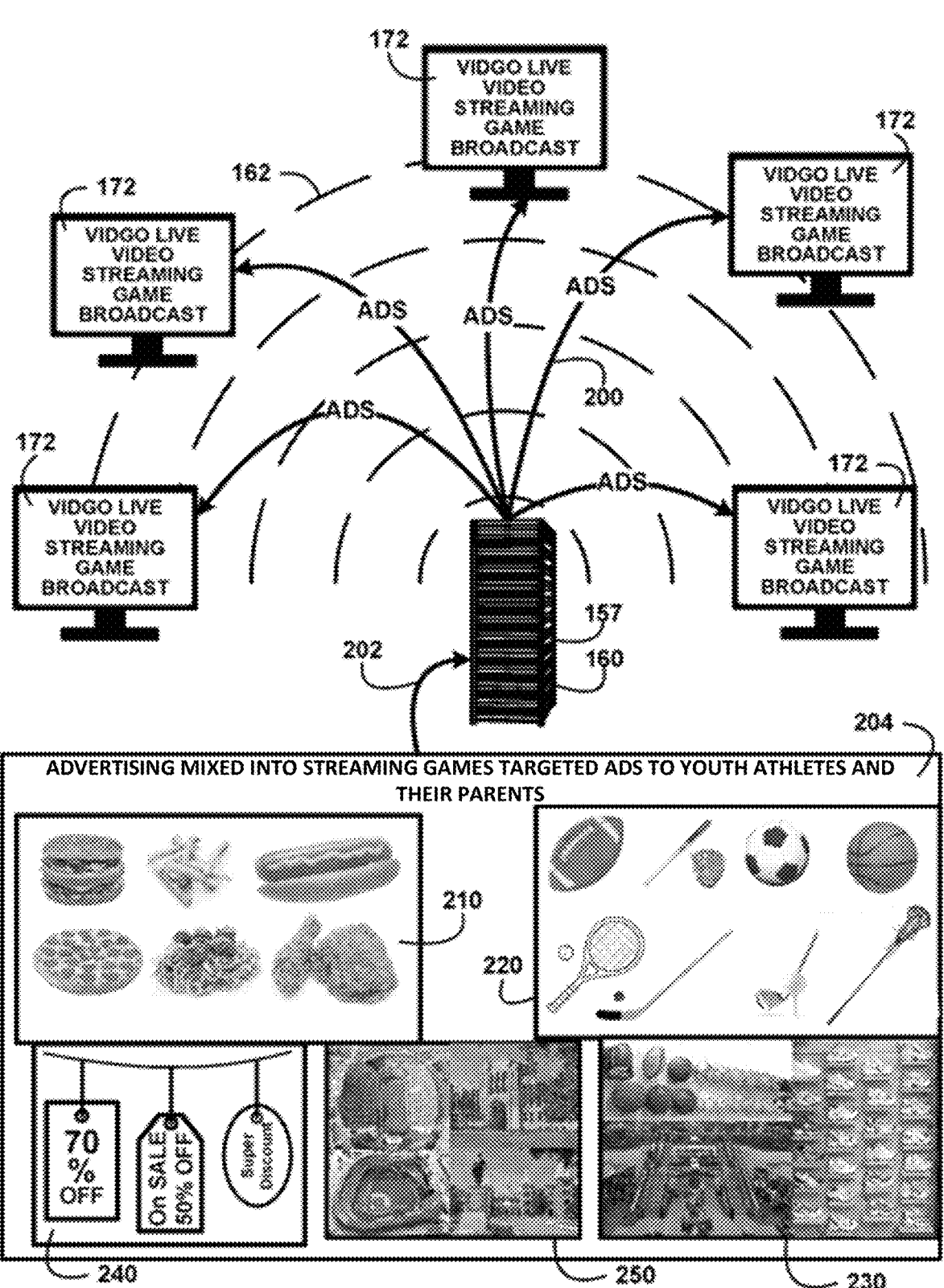
FIG. 2 shows for illustrative purposes only an example of retail advertising mixed into streaming of one embodiment.

FIG. 2 illustrates, for example purposes only, an embodiment of how retail and promotional advertising can be dynamically inserted into a live video-streaming broadcast. As shown, multiple camera transmissions generated at the venue are conveyed to the VIDGO network server 157, which transmits synchronized live video streams through an internet signal transmitter 160 and distributes them as the VIDGO network server internet signal 162. The resulting VIDGO live video-streaming game broadcast 172 can be viewed on a plurality of subscriber digital devices 170 of FIG. 1 executing the VIDGO app 180 of FIG. 1 or equivalent playback software.

Within the VIDGO network server 157, an advertising-insertion engine may insert 202 one or more ad signals 200 into the outgoing live-stream broadcast in real time. The ad-insertion process can utilize server-side ad-insertion (SSAI) or client-side ad-insertion (CSAI) techniques, allowing targeted retail and sponsorship content to be seamlessly mixed into the live feed. Advertising mixed into streaming games targeted ads to youth athletes and their parents 204 and may include retail promotions, services, and other commercial content. Examples of such advertisements include food-service promotions 210, sports-equipment advertisements 220, sporting-goods store offers 230, local or seasonal sales promotions 240, and professional or collegiate merchandise advertisements 250, according to one embodiment.

In certain embodiments, the VIDGO network server 157 or associated analytics module may employ AI-driven targeting and content-selection algorithms that analyze contextual and viewer data-such as event type, geographic region, or audience demographics—to select and render the most relevant advertising for each viewer session. These targeted ad streams may be delivered with minimal latency, synchronized across all active camera feeds, and logged for subsequent reporting and performance analytics using data stored in the server database 158 of FIG. 1. This architecture enables advertisers to reach highly specific audiences while maintaining uninterrupted broadcast quality and user engagement.

Figure 3:
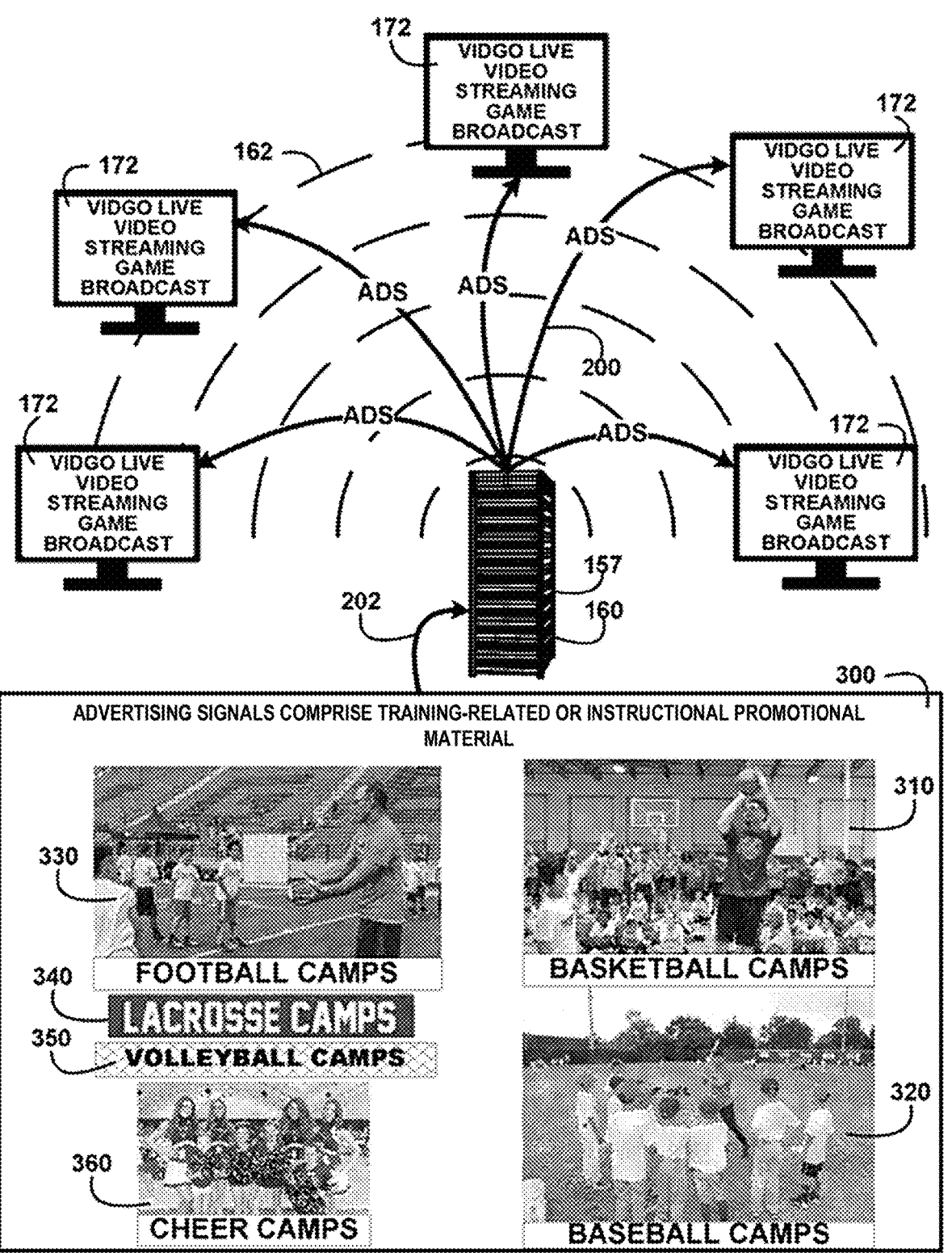
FIG. 3 shows for illustrative purposes only an example of training advertising mixed into streaming of one embodi-ment.

FIG. 3 illustrates, for example purposes only, an embodiment of how training and educational advertising content can be integrated into a live video streaming broadcast. As shown, multiple video transmissions received by the VIDGO network server 157 are processed and broadcast through the internet signal transmitter 160, transmitting the synchronized VIDGO network server internet signal 162. The outgoing signal 162 forms the VIDGO live video streaming game broadcast 172, which is viewable on a plurality of subscriber digital devices having the VIDGO app 180 of FIG. 1 installed or equivalent streaming software.

The VIDGO network server 157 includes an ad-insertion module configured to insert 202 advertising signals 200 into the live-streaming broadcast in real time. In this embodiment, the advertising signals comprise training-related or instructional promotional material 300 directed toward youth and amateur athletes, parents, and coaches. Such training advertisements may include promotions for basketball camps 310, baseball camps 320, football camps 330, lacrosse camps 340, volleyball camps 350, and cheerleading camps 360, among other sport-specific training programs.

In some embodiments, the advertising module employs AI-based content classification and audience profiling to match specific training opportunities to the demographics and geographic regions associated with the live-streamed event. For instance, metadata obtained from user registration profiles or viewing history may be analyzed by a recommendation engine to determine the most contextually relevant training advertisement for each viewer. The system may further employ adaptive insertion timing, ensuring that promotional material appears during natural game breaks, such as timeouts or halftime intervals, thereby maintaining an uninterrupted and engaging viewing experience.

Additionally, the VIDGO network server 157 may record impression and engagement data corresponding to the inserted training advertisements, storing such data in the database 158 of FIG. 1 for later performance analysis and advertiser reporting. This enables the platform to provide targeted, measurable advertising outcomes to training organizations and sponsors while delivering relevant, value-added content to viewers, according to one embodiment.

Figure 4:
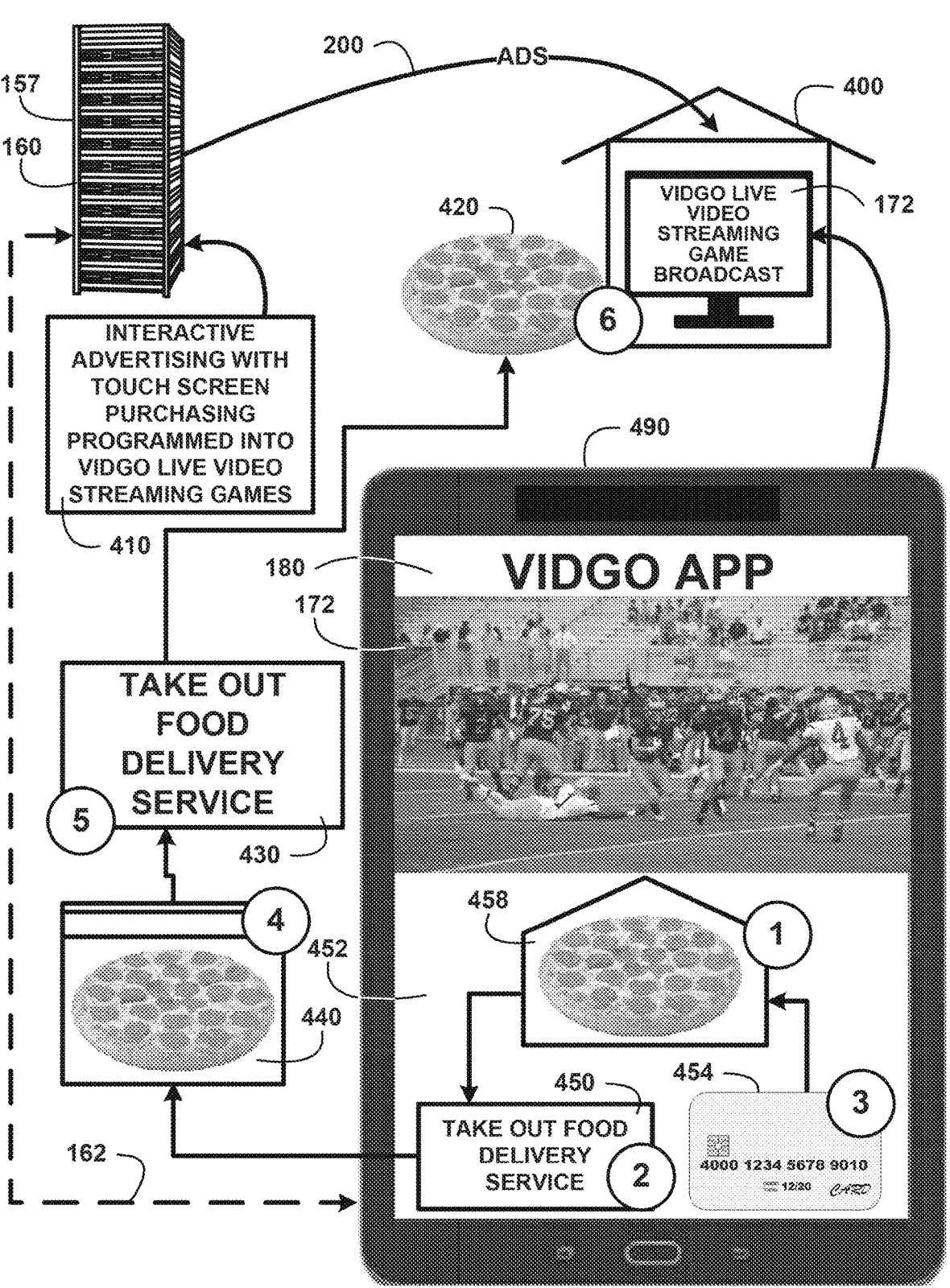
FIG. 4 shows for illustrative purposes only an example of interactive advertising with touch screen purchasing of one embodiment.

FIG. 4 illustrates, for example purposes only, an embodiment of interactive advertising integrated into a live video-streaming environment, enabling viewers to engage in real-time purchasing through a touchscreen interface. As shown, the internet signal transmitter 160 delivers ad signals 200 generated by the VIDGO network server 157 as part of the VIDGO network server internet signal 162. The broadcast is received on a subscriber digital device 170 of FIG. 1, such as a tablet 490 executing the VIDGO app 180. The transmitted ad signals 200 may include interactive or shoppable advertising content embedded within the VIDGO live video-streaming game 410. In this embodiment, the VIDGO app 180 presents the VIDGO live video-streaming game broadcast 172 within an interactive interface that allows users to view gameplay while simultaneously engaging with real-time retail offerings displayed alongside or within the stream.

As shown in FIG. 4, the internet signal 162 transmits the VIDGO live video-streaming game broadcast 172, which incorporates a VIDGO app 180 interactive retail ordering feature 452. During the live broadcast, a subscribed viewer may engage in an in-application purchasing process directly through the streaming interface. In one example, the viewer selects a displayed retail advertisement on the tablet 458, such as a local pizzeria promotion, and places an online order through the VIDGO app 180.

The subscribed viewer may then select a take-out or food delivery service 454, confirm the order, and complete payment using a stored or entered bank card 450. Once the order is confirmed, the delivery service coordinates fulfillment, with the food being prepared and picked up from the retailer

440, transported by the selected delivery provider 430, and delivered 420 to the subscriber's home 400. Throughout the transaction, the viewer continues to watch the VIDGO live video-streaming game broadcast 172 using a split-screen or picture-in-picture feature of the VIDGO app 180, allowing uninterrupted viewing.

In some embodiments, the VIDGO network server 157 and VIDGO app 180 utilize secure transaction protocols and user authentication systems to process payments and protect personal data. The interactive advertising platform may further employ AI-driven recommendation algorithms, dynamic pricing models, and real-time contextual placement to personalize retail offers for each viewer based on event context, location, or historical engagement. This architecture enables an immersive, low-latency shopping experience integrated directly into the live sports broadcast, thereby enhancing both viewer engagement and advertiser effectiveness, according to one embodiment.

The interactive advertisement may employ touch-screen interfaces, gesture-based controls, or voice-assisted commands that enable the viewer to select, configure, and complete purchases of advertised products or services without interrupting the live broadcast. The underlying commerce functionality can be implemented through integrated in-application application programming interfaces (APIs), cloud-hosted microservices, or AI-driven recommendation engines designed to tailor promotional content to each viewer's behavior, contextual engagement, or geographic location. This configuration allows real-time, low-latency insertion of personalized promotional opportunities directly within the live viewing environment, thereby delivering a seamless and interactive user experience according to one embodiment.

Figure 5:
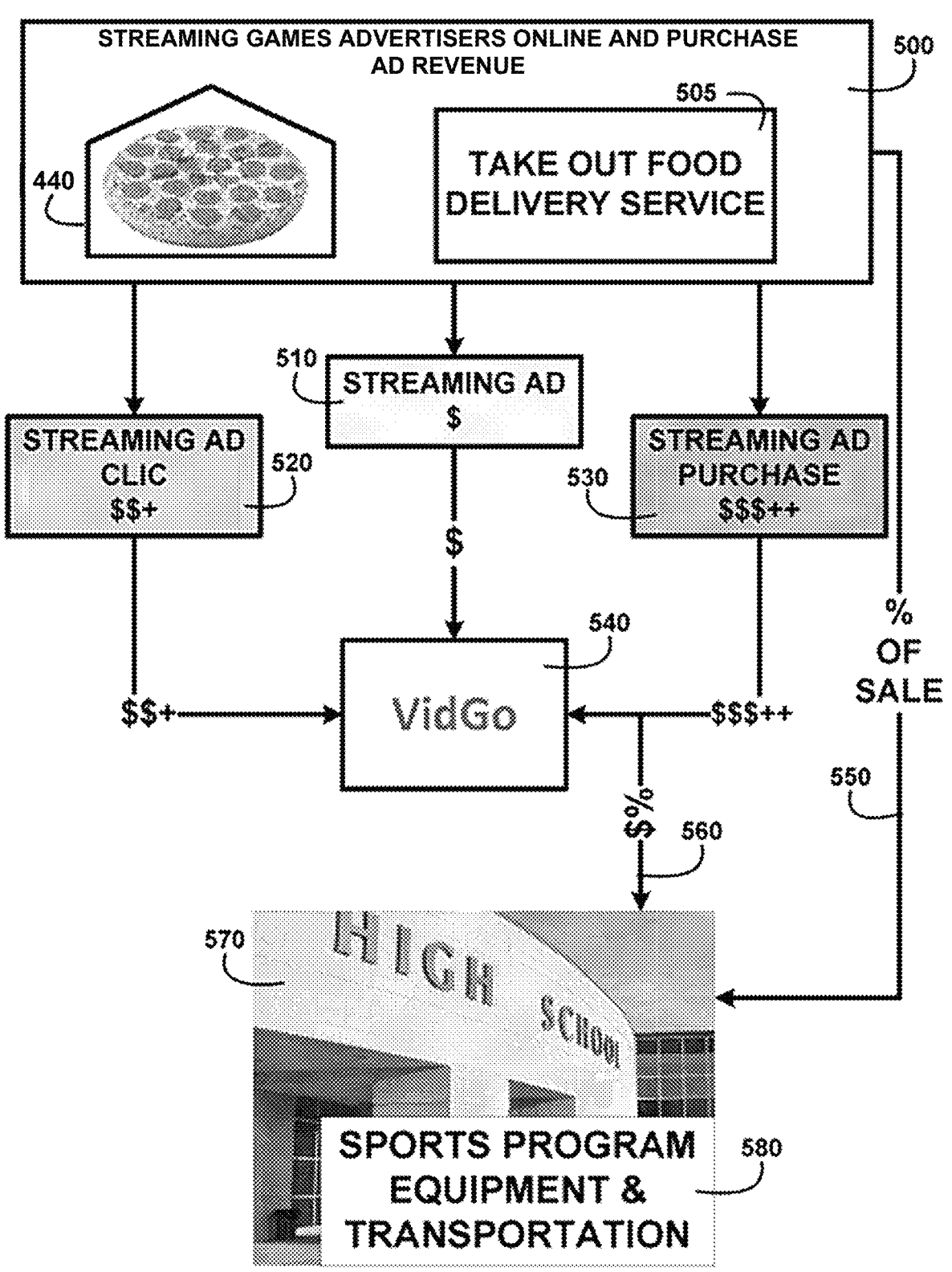
FIG. 5 shows for illustrative purposes only an example of streaming advertiser ad revenue of one embodiment.

FIG. 5 illustrates, for example purposes only, an embodiment of how advertiser-generated revenue can be derived and distributed from live video-streaming broadcasts. As shown, streaming games incorporate advertisers that participate in online campaigns and purchase-based ad revenue models 500, building upon the interactive retail process described in FIG. 4. In this example, the food retailer advertiser 440 and the take-out food delivery service advertiser 505 each contribute to a multi-tiered advertising revenue structure. Online advertising within the VIDGO platform may generate revenue across several levels of engagement, including general streaming advertisement revenue 510, click-based advertisement revenue 520, and purchase-conversion revenue 530, which reflects sales completed through interactive advertisements.

The VIDGO network may establish agreements with advertisers in which a defined percentage of purchase sales or advertising proceeds is donated to participating local schools or community athletic programs 550. The VIDGO system receives total advertising revenue 540 and, in certain embodiments, allocates or donates a percentage of that revenue 560 to the schools featured or associated with the live-streaming broadcast. Participating schools 570 can use the donated funds to support athletic programs, purchase sports equipment, or cover transportation expenses for away competitions 580, according to one embodiment.

In some implementations, the VIDGO network server 157 of FIG. 1 may employ automated tracking and reporting mechanisms to attribute advertising revenue to specific broadcasts, events, or viewer demographics. AI-based analytics may be used to measure engagement rates, conversion performance, and donation allocation accuracy, thereby ensuring transparent, verifiable revenue sharing between advertisers, broadcasters, and participating institutions. This integrated revenue ecosystem encourages community involvement, strengthens advertiser-brand alignment, and provides a measurable social impact through localized reinvestment in youth and school-based sports programs.

Figure 6:
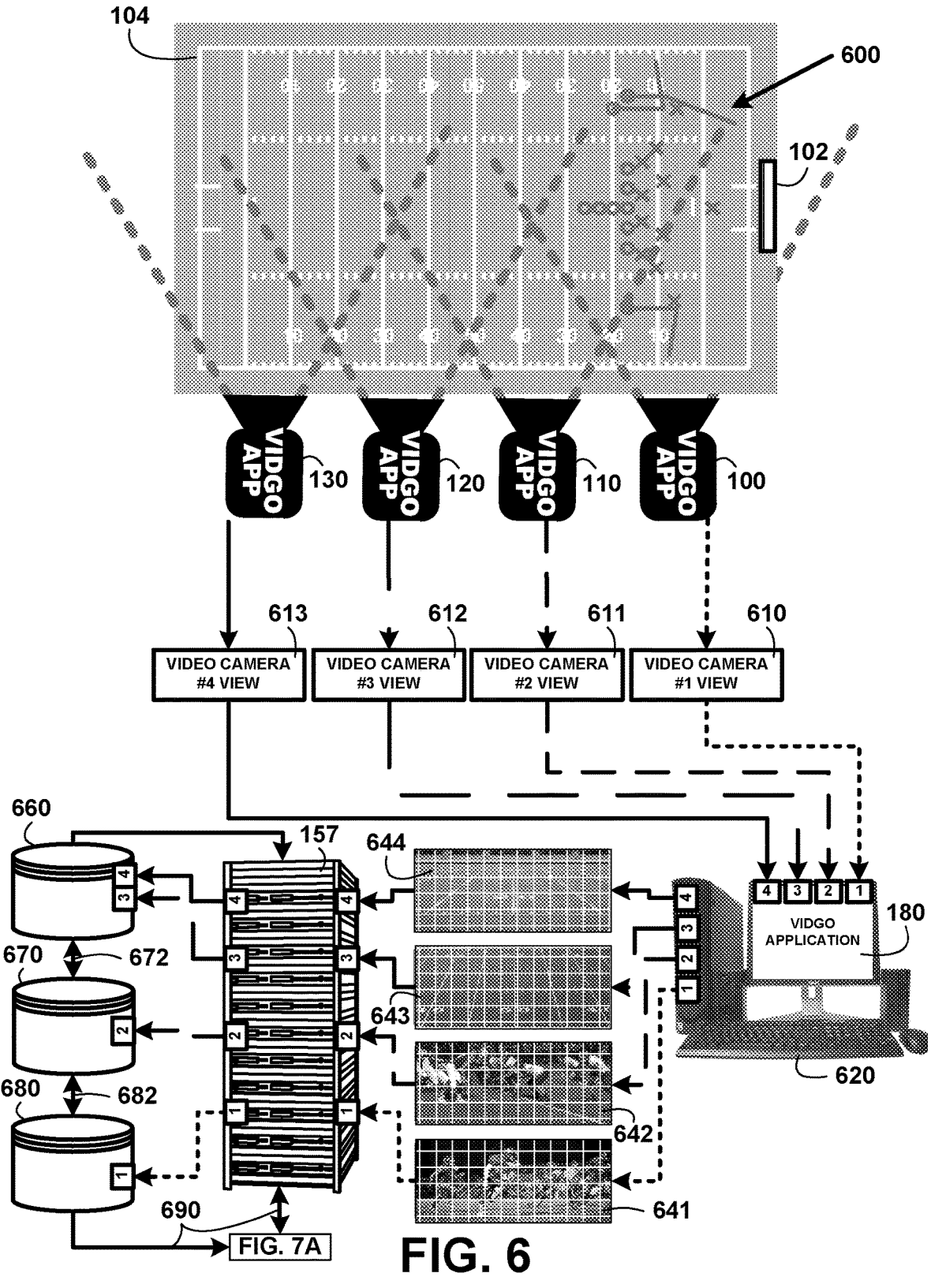
FIG. 6 shows for illustrative purposes only an example of multi-camera live-streaming processing of one embodiment.

FIG. 6 illustrates, for example purposes only, an embodiment of multi-camera live-streaming processing for sports broadcasting. The figure depicts a sports venue, such as a high school football field 104, including a scoreboard 102. Two opposing teams are shown schematically in playbook format 600 for illustrative clarity. Positioned around the field are multiple video cameras, including camera #1 100, camera #2 110, camera #3 120, and camera #4 130, each providing corresponding views 610, 611, 612, and 613. Each camera operates capture software such as the VIDGO app 180 or an equivalent capture platform capable of encoding and transmitting live video streams. The cellular or broadband transmissions from each camera are received by a VIDGO network computer 620 having a VIDGO application 630, which is communicatively coupled to a VIDGO network server 157 for further processing and synchronization.

The VIDGO network computer 620, in conjunction with the VIDGO network server 157, executes real-time processing on the incoming camera feeds using one or more digital processors. For example, the video feed from camera #1 100 may be processed by a server-based digital processor 642 configured to detect motion on the field, track the football, and identify probable zones of action for automated highlight generation 641. Similarly, the video feeds from cameras #2 110, #3 120, and #4 130 may be analyzed by additional processors 642, 643, and 644. Each processor may apply an electronically overlaid coordinate grid, AI-based computer-vision model, or motion-vector analysis to detect player movement, object trajectories, and relevant gameplay events. These detections allow the system to isolate key plays and automatically generate real-time highlight selections during the live broadcast.

Within the VIDGO network server 157, highlight segments identified from the video feed of camera #1 100 are stored in a first auto-highlights database 680, while the complete, continuous footage from the same camera is simultaneously recorded in a full-reel database 682.

Likewise, highlight segments from camera #2 110 are recorded in a second auto-highlights database 670, with its complete footage stored in a corresponding full-reel database 672. In the example shown, no significant motion is detected in the camera #3 120 or camera #4 130 views; therefore, their continuous video data is stored in a full-reel database 660 without auto-highlight segmentation.

All full-reel footage from the cameras can be retrieved for playback, review, or further analysis. During or following the live event, the auto-highlight selections from all active cameras are chronologically synchronized and merged into a single composite highlight reel, which is stored in a designated "game highlights" section of the full-reel database. Each recorded segment is tagged with metadata including the home-team and visitor-team identifiers, event date, camera number, and other contextual data, thereby enabling efficient indexing, querying, and retrieval for replay or analytics according to one embodiment.

Figures 7, 7A:
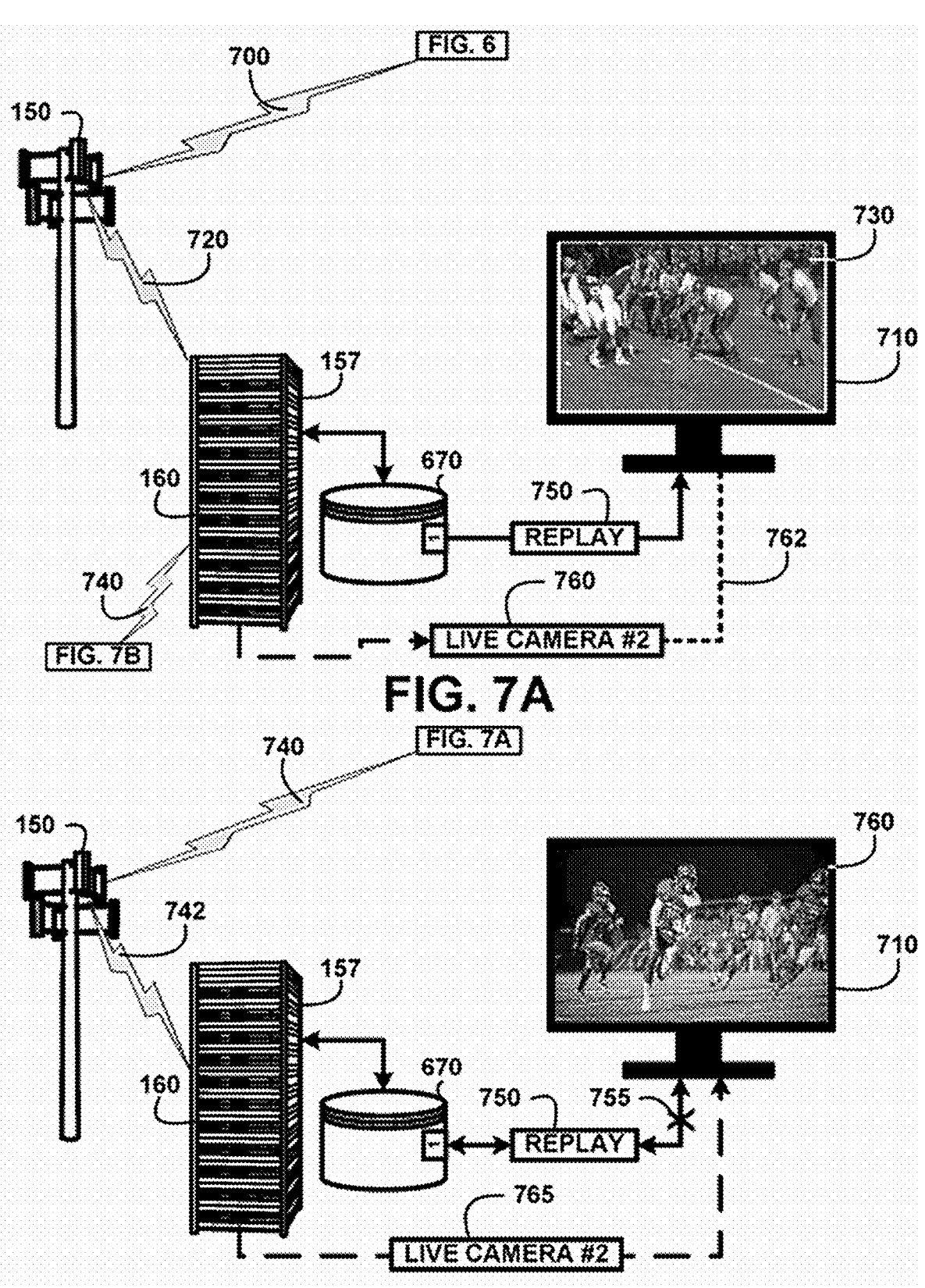
FIG. 7A shows for illustrative purposes only an example of first camera live-streaming auto action prioritizing of one embodiment.

FIG. 7A illustrates, for example purposes only, an embodiment of an automated prioritization system for selecting and displaying camera feeds and highlight replays during live streaming events. This embodiment represents a continuation of the multi-camera streaming configuration described in FIG. 6. As shown, a cellular tower 150 receives live video transmissions from multiple capture devices 100-130 of FIG. 1, each executing live-streaming capture software. The transmissions are relayed to a networked computing system server 157 and database 670, which processes the incoming video streams and transmits them via an internet signal transmitter 160 to a plurality of subscribed viewer devices 710 connected through commercial network infrastructure.

In the example shown, live video from a designated second camera 760 is actively streamed through the system to viewer devices, while an AI-driven stream-prioritization module 700 continuously evaluates motion patterns, event segmentation, and contextual gameplay triggers within each active camera feed. When the system detects that live gameplay has paused-such as during an end-of-play event, time-out, or other stoppage in action—the AI prioritization module automatically recommends or initiates a highlight replay 750 sourced from a previously recorded camera feed (e.g., camera #1). The highlight replay 750 is retrieved from a local or cloud-based auto-highlights database and is processed in near real time through the prioritization logic 700, which ensures synchronization with the current broadcast timeline.

The highlight segment 750 is displayed 730 on the subscribed viewer device 710 while the live feed from the secondary camera 760 continues to stream in the background 762, ensuring uninterrupted continuity of the overall broadcast. The replay is configured for a defined playback interval, typically constrained by the expected duration of the pause in gameplay, after which the system automatically transitions back to the live stream from the active camera feed. The prioritization algorithm can weight multiple factors-such as viewer engagement, recent scoring probability, or spatial proximity of the replayed event to current field activity—to determine the most relevant highlight to present. This enables an intelligent, context-aware playback experience that preserves real-time situational awareness while providing dynamic, short-form replay content between live plays, according to one embodiment.

FIG. 7B illustrates, for example purposes only, an embodiment of adaptive stream-switching and prioritization logic employed during transitions between highlight replays and resumed live gameplay. As shown, a cellular tower 150 receives continuous live-streaming data from the multiple cameras 100-130 of FIG. 1, with the data routed to the centralized computing system 157 for inference-based prioritization and playback control. The system's analytics engine monitors each incoming video feed to detect event conditions such as player motion, formation alignment, or referee signals indicating that gameplay is about to resume. Based on these contextual cues, the inference engine determines that live action is imminent and triggers a seamless transition back to the appropriate live camera feed.

In this example, live streaming from the second camera 765 continues in real-time through the internet signal transmitter 160, while a previously active highlight replay 750—originating from camera #1—is automatically interrupted 755 on the viewer device 710. The system ensures that the live video feed 760 from the second camera is instantly displayed on the subscribed viewer's interface, maintaining real-time synchronization with the resumed gameplay. The replay session is thereby terminated or minimized in accordance with the detected change in game state, avoiding latency or overlap between recorded and live content.

In certain embodiments, the auto-prioritization logic may employ AI models trained on historical sports footage to recognize pre-play formations, body-language patterns, or environmental sound cues that precede gameplay resumption. These models can infer game-state transitions at the sub-second level, allowing the network system to dynamically prioritize live content without requiring manual operator input. A user may still manually request previously generated auto-highlight replays 750 at any time through the viewer interface, enabling flexible review of recorded plays between live sequences. The combination of AI-based event detection, real-time synchronization, and context-driven playback control ensures that the broadcast flow remains uninterrupted and visually coherent, providing a professional-grade viewing experience across multiple simultaneous streams, according to one embodiment.

Figure 8:
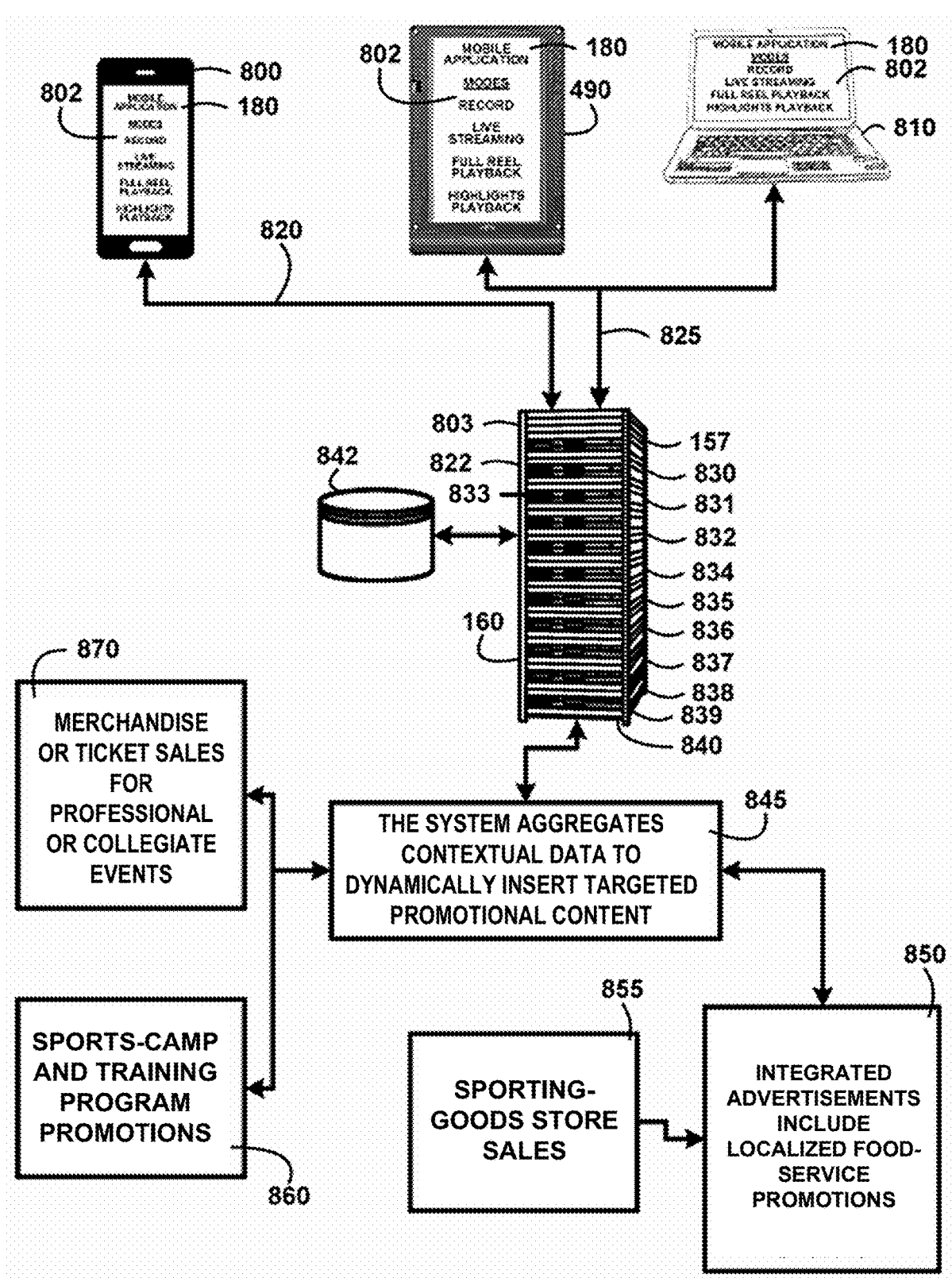
FIG. 8 shows for illustrative purposes only an example of ad mixing into streaming of one embodiment.

FIG. 8 illustrates, for example purposes only, an embodiment of a multi-device, cloud-connected media framework for dynamically integrating advertising into live-streamed video content. A plurality of subscriber devices-including a smartphone 800, a tablet 490, a personal computer, and a laptop computer 810—each operate a mobile or desktop application 180 capable of recording, live-streaming, and playback. The application 180 presents a graphical user interface including a mode-selection menu 802 that allows a user to select among various operational modes, such as "Record," "Live Stream," "Full Reel Playback," and "Highlights Playback." The mode-selection menu 802 may be accessed through a home screen or dashboard hosted on a network-based website 803 that resides on or is linked to a network server 157.

Each application 180 instance communicates with the network server 157, which is configured to perform both video content management and AI-driven ad-mixing operations. The network server 157 is operatively connected to a wide range of hardware and software subsystems, including at least one digital database 830, at least one digital signal processor 831, at least one optical character recognition (OCR) device 832, at least one Wi-Fi-connectable device 833, at least one printer 834, at least one video display or playback device 835, at least one cellular-connectable device 836, at least one data-mining device 837, at least one internet-connectable device 838, at least one internet signal transmitter 160, at least one secondary OCR module 839, at least one digital memory or storage device 840, at least one advertising database 842, and a sports-equipment recognition and tracking device 822.

The sports-equipment recognition and tracking device 822 may include an embedded database containing reference data for various sports equipment-such as footballs, baseballs, tennis balls, hockey pucks, bats, sticks, racquets, and other identifiable gear-along with their respective physical parameters, dimensions, aspect ratios, and color models. During live video capture, the tracking device 822 scans video frames and performs pattern matching between the captured imagery and the stored reference profiles to detect and identify equipment within the scene. Once an object match is confirmed, the system tracks the trajectory, velocity, and location of the identified item over time, generating metadata tags that are appended to the live video stream. These object-recognition tags can be used to trigger targeted advertising relevant to the identified sport, brand, or associated demographic profile.

In certain embodiments, the advertising engine may conduct internet-based data mining 837 to retrieve promotional materials from local or contracted advertisers. The system aggregates contextual data to dynamically insert targeted promotional content 845 into the live stream or on-screen user interface. Examples of integrated advertisements include localized food-service promotions 850, sporting-goods store sales 855, sports-camp and training program promotions 860, and merchandise or ticket sales for professional or collegiate events 870. The ad-mixing process employs both server-side ad insertion (SSAI) and client-side ad insertion (CSAI) to ensure seamless integration of commercial content into live or replayed media streams. The AI-driven ad engine evaluates multiple parameters-including player activity, detected equipment type, and user-viewing behavior—to determine optimal ad timing, content relevance, and format delivery. This architecture enables adaptive, real-time advertising tailored to live event context and viewer preferences, according to one embodiment.

Figure 9:
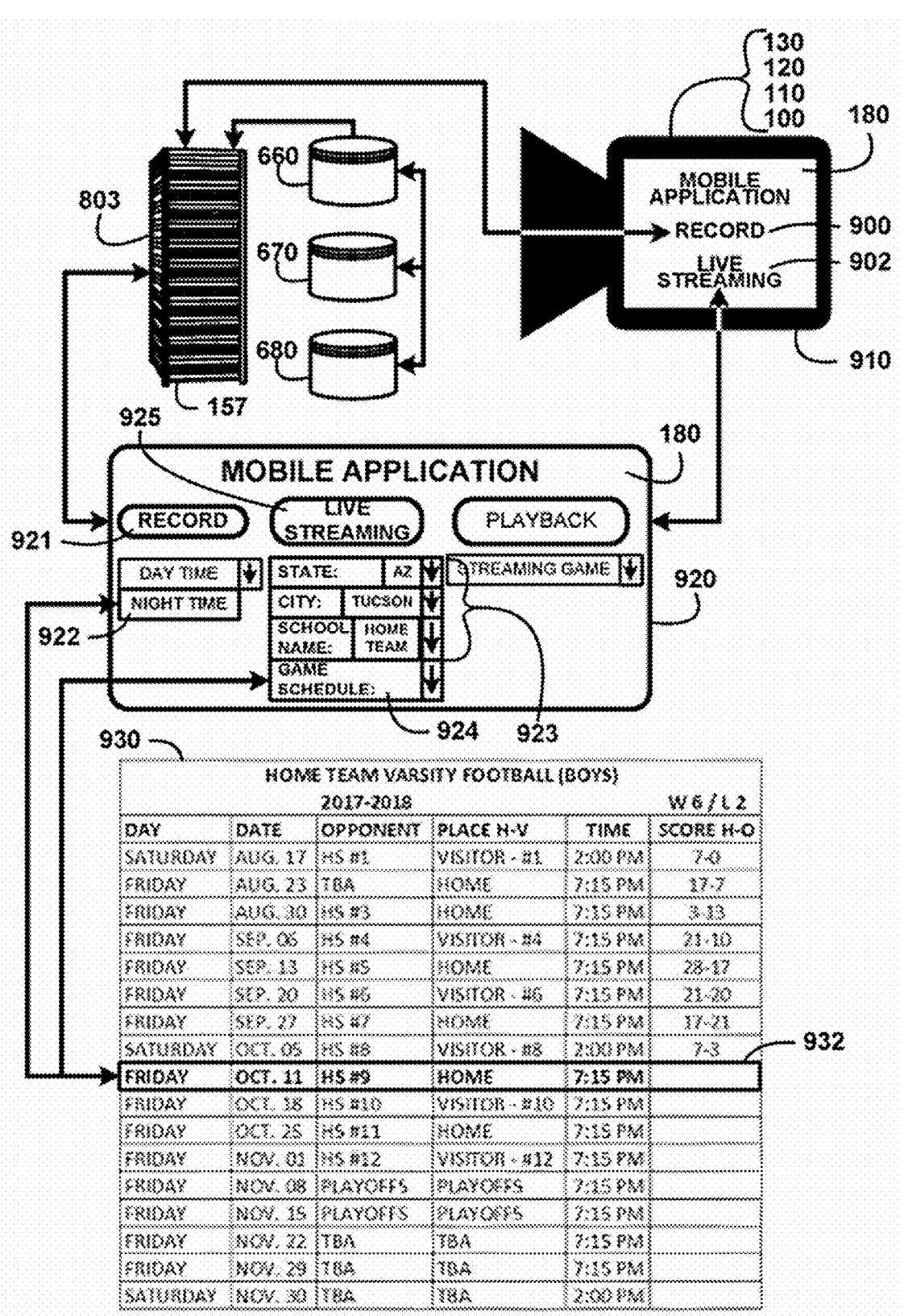
FIG. 9 shows for illustrative purposes only an example of record mode settings of one embodiment.

FIG. 9 illustrates, for example purposes only, an embodiment of a record and live-streaming configuration interface implemented within the same mobile application 180 and corresponding web-based control environment 803. The interface displays mode options-"Record," "Live Stream," "Full Reel Playback," and "Highlights Playback"—as shown in the mode-selection menu 802 of FIG. 8. When the "Record" mode 900 or "Live Stream" mode 902 is selected, the corresponding capture device (e.g., cameras 100, 110, 120, 130) establishes a network connection through a cellular or broadband interface 910 to the centralized network server 157. Each connected camera operates in a synchronized environment where recorded footage is uploaded, indexed, and stored across distributed databases. For example, footage from cameras #3 and #4 is stored in a full-reel database 660, while highlight segments from cameras #1 and #2 are stored in first and second auto-highlights databases 680 and 670, respectively.

The application's configuration interface may include a contextual setup menu 920 providing user-selectable parameters such as recording state 921, geographic region (e.g., state dropdown 923), city, and institution or team name. For example, a user may select "AZ" for state, "Tucson" for city, and a specific "Home Team" entry for school or organization identification. Environmental metadata, such as lighting conditions, may be automatically derived and displayed in an ambient-light field 922, where "Night" may be automatically selected based on system-detected time (e.g., 7:15 PM). A game-schedule dropdown 924 may be dynamically populated through data-mining and OCR-derived parsing of web-based schedules from participating schools or leagues. This schedule data is digitally processed and indexed into the server's database 930 to provide selectable events for live streaming 925.

A selected camera operator or user may then choose a particular scheduled event 932 for live broadcasting. During recording or streaming, the system's digital processor 831 of FIG. 8 continuously receives and updates performance statistics, calculating cumulative win/loss records (e.g., "W6/ L2") based on prior game data. The OCR subsystem processes image captures of scoreboard readings and converts them into machine-readable text, which is then time-stamped and stored for analytics and display within the interface. The resulting dataset forms a structured, queryable archive of both video and statistical information for real-time display or later playback and analysis, according to one embodiment.

The mobile application 180 further enables each subscriber or camera operator to transform their personal device into an interactive, multi-camera production studio for live broadcasting. Using the synchronization protocols and control overlays built into the system, multiple devices may simultaneously record, stream, and switch between video feeds in real-time. The interface supports manual or AI-assisted switching logic to prioritize specific camera angles, replay highlights, or event types without interrupting the broadcast continuity. The application thereby provides multi-camera broadcast functionality directly to consumer-grade hardware while maintaining professional-grade synchronization and resolution quality.

The same framework allows recorded live broadcasts to be accessed across multiple viewing devices for replay, analysis, or social sharing. Stored streams may include embedded metadata tags for event identification, equipment tracking, and advertisement reference markers. This system architecture effectively converts any compatible smart device into a distributed, low-latency live broadcasting node with integrated analytics and advertising support, enabling scalable production of sporting events, training sessions, and other live performances without the need for dedicated hardware infrastructure, according to one embodiment.

Figure 10:
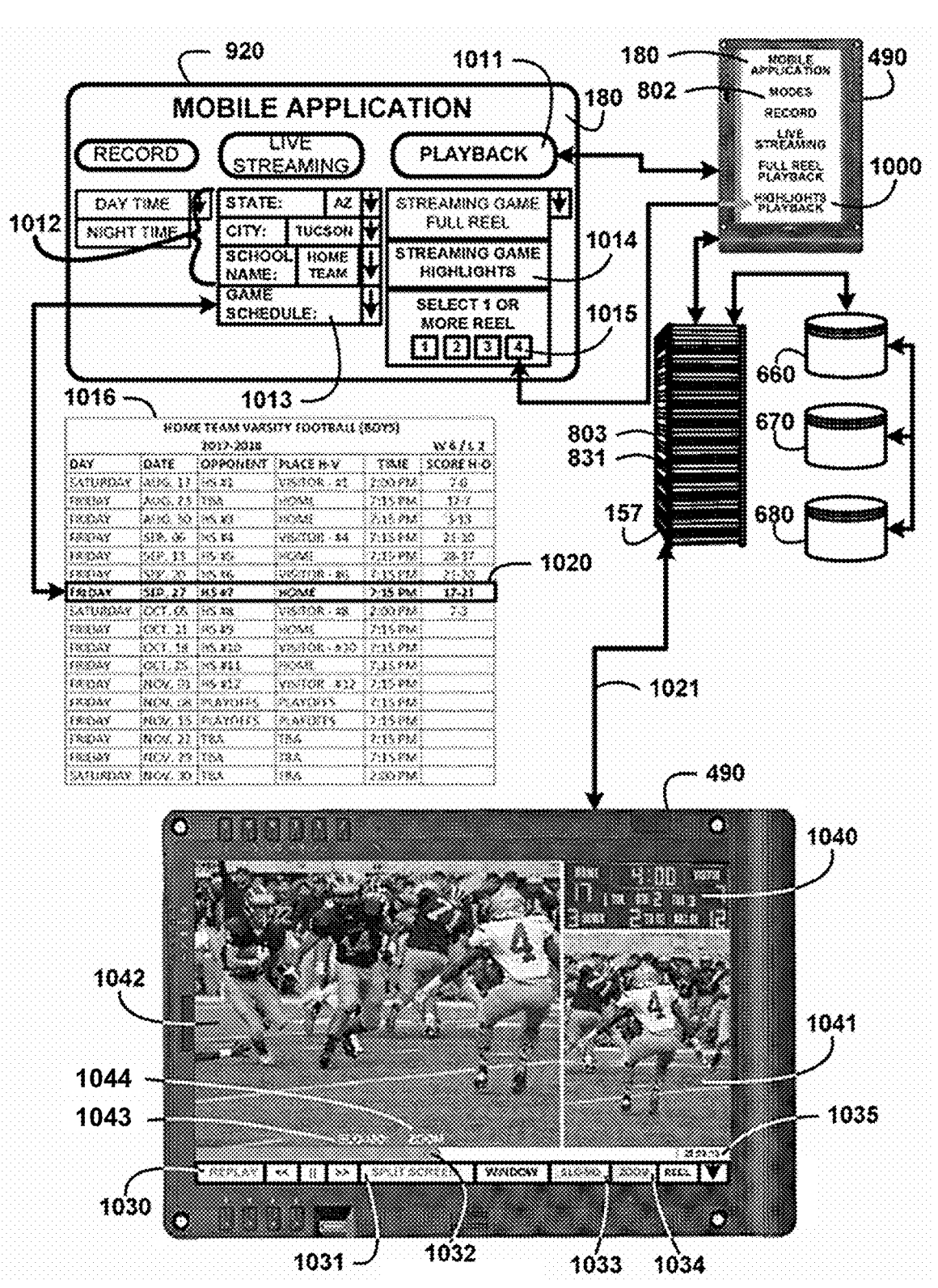
FIG. 10 shows for illustrative purposes only an example of highlights playback settings of one embodiment.

FIG. 10 illustrates, for example purposes only, an embodiment of a highlights playback configuration system implemented within a multi-mode video-streaming and recording application 180. The system may operate on a variety of viewer devices, including a tablet 490, smartphone, laptop, or other connected display unit. The application 180 presents an interactive mode-selection interface that allows users to choose among several functional states, including "Record," "Live Stream," "Full Reel Playback," and "Highlights Playback." These selectable options are displayed via a mode-selection menu 920, accessible through a home screen or portal 803 hosted on a network-based control system or server 157 having a digital processor 831.

When a user selects the "Highlights Playback" option 1000, the application transitions to a playback mode 1011, in which the viewer can configure parameters for localized or remote content retrieval. The viewer may specify metadata attributes such as state, city, and institution or team name 1012, which serve as search filters for retrieving relevant stored game data from the network database. A schedule interface 1013 displays the identified team's season or event schedule, enabling intuitive access to past recorded games.

The system may include integrated search automation that uses optical character recognition (OCR) and data-mining algorithms to populate the schedule fields based on verified, publicly available sources. This enables viewers to locate specific matches or performances with minimal manual input, thereby enhancing accessibility and streamlining highlight retrieval. The interface is designed to dynamically synchronize with the server's databases to ensure that user queries and selections reflect the most current event metadata available.

As shown in FIG. 10, the viewer may select a specific event, such as a game in which the designated team lost 1020, by referencing the season schedule 1016. Following event selection, the user can filter playback content based on available highlight types 1014 and associated camera feeds 1015, such as selecting highlights from camera #4 to view unique angles or specialized shots. These selections are transmitted from the user device to the centralized network server 157, where the system validates and retrieves the corresponding data sets.

The server accesses multiple synchronized video repositories: full-length continuous footage from cameras #3 and #4 stored in a full-reel database 660, auto-highlight segments from camera #2 stored in a second auto-highlights database 670, and highlight segments from camera #1 stored in a first auto-highlights database 680. Upon retrieval, the requested highlight clips are automatically transcoded, compressed, and queued for delivery to the user device in a format optimized for network bandwidth and device resolution. The system supports adaptive bitrate streaming and time-synchronized playback to ensure smooth user experience across variable network conditions. These database and delivery operations may be fully automated under control of a media asset management (MAM) layer, ensuring consistency and synchronization across camera feeds, according to one embodiment.

Once the highlight footage has been received by the viewer's device 1021 (for example, a tablet 490), the playback interface displays a range of interactive control elements. The user may select playback functions such as "Replay" 1030, "Split Screen" 1031, "Slow Motion" 1033, and "Zoom" 1034 through a control overlay. A visual timer 1032 may be shown for the selected camera feed (e.g., camera #4), along with an on-screen scoreboard 1040 displaying game time progression 1035, such as indicating the second quarter.

The playback mode 1011 supports a multi-layered display configuration, wherein a split-screen layout 1031 simultaneously presents a live or previously captured scoreboard 1040, an unzoomed full-field view 1041, and one or more replay windows containing auto-highlight content 1042. The interface may display real-time indicators confirming that slow-motion 1043 and zoom 1044 modes are active, allowing the viewer to toggle or adjust these features seamlessly during playback. The playback engine synchronizes user-initiated mode changes with the underlying video timeline, ensuring frame-accurate transitions even during variable-speed playback.

The system may incorporate AI-based playback assistance, dynamically suggesting relevant replays or recommended camera views based on viewer behavior, event context, or detected gameplay intensity. This creates an adaptive user experience that combines manual control with automated content curation, suitable for both casual viewers and professional analysis applications, according to one embodiment.

Figure 11:
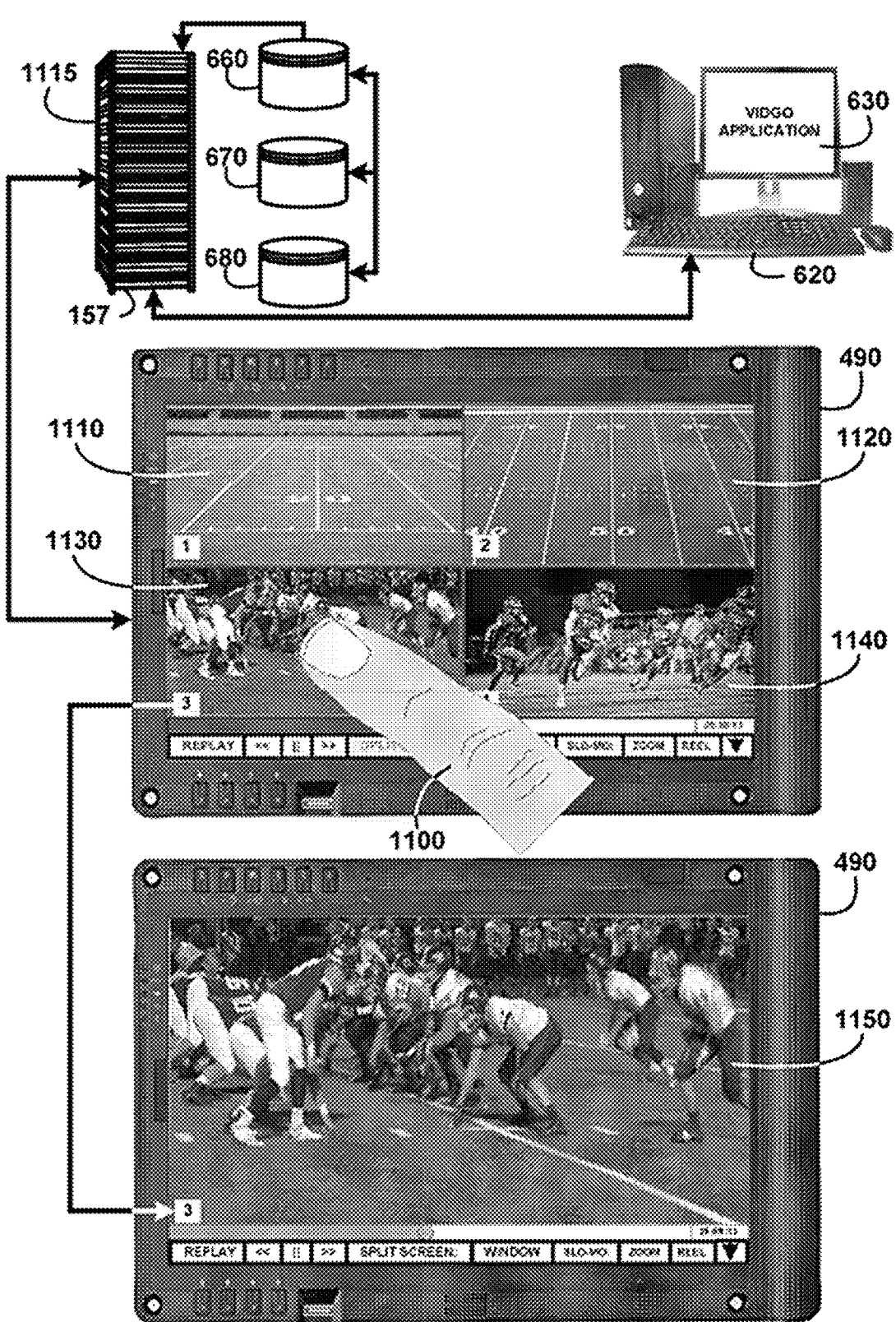
FIG. 11 shows for illustrative purposes only an example of split screen mode selection of one embodiment.

FIG. 11 illustrates, for example purposes only, an embodiment of a multi-camera split-screen viewing system with adaptive camera prioritization. In this configuration, live or recorded cellular transmissions from each camera are received by a computing device 620 having a VIDGO application 630, which is coupled to the central processing and storage infrastructure 157. The computing device includes a video-recognition subsystem 1115 capable of analyzing live feeds for event detection, image classification, and motion-based prioritization. The system processes video inputs from cameras #1 through #4, where the full-length footage from cameras #3 and #4 is stored in a full-reel database 660, and auto-highlight selections from cameras #1 and #2 are stored in databases 680 and 670, respectively.

On the viewer's tablet 490, the playback interface presents live-streaming or recorded video feeds from all four cameras simultaneously: camera #1 1110, camera #2 1120, camera #3 1130, and camera #4 1140. The default view displays all feeds in a grid or split-screen layout, allowing users to monitor multiple perspectives concurrently. The user may tap 1100 or select a camera tile-such as camera #3 1130—to enlarge that view 1150 and focus on the primary action, particularly when other cameras are inactive or show non-relevant content. This operation triggers an intelligent view-switching process that resizes, re-renders, and re-aligns the selected stream for full-screen display while maintaining synchronized audio and data overlays.

The interface further allows multi-selection of streams, such as displaying both camera #3 and camera #4 feeds simultaneously in a dual-split configuration. The system's AI recognition module may automatically recommend camera transitions based on detected activity levels, object motion vectors, or crowd reaction intensity. This ensures that the most relevant feed is prioritized while providing users the flexibility to manually override selections. The combination of automated and user-driven view management provides an immersive, professional-grade multi-camera experience with minimal latency, optimized for real-time decision-making and dynamic event coverage, according to one embodiment.

Figures 12A, 12B, 12C:
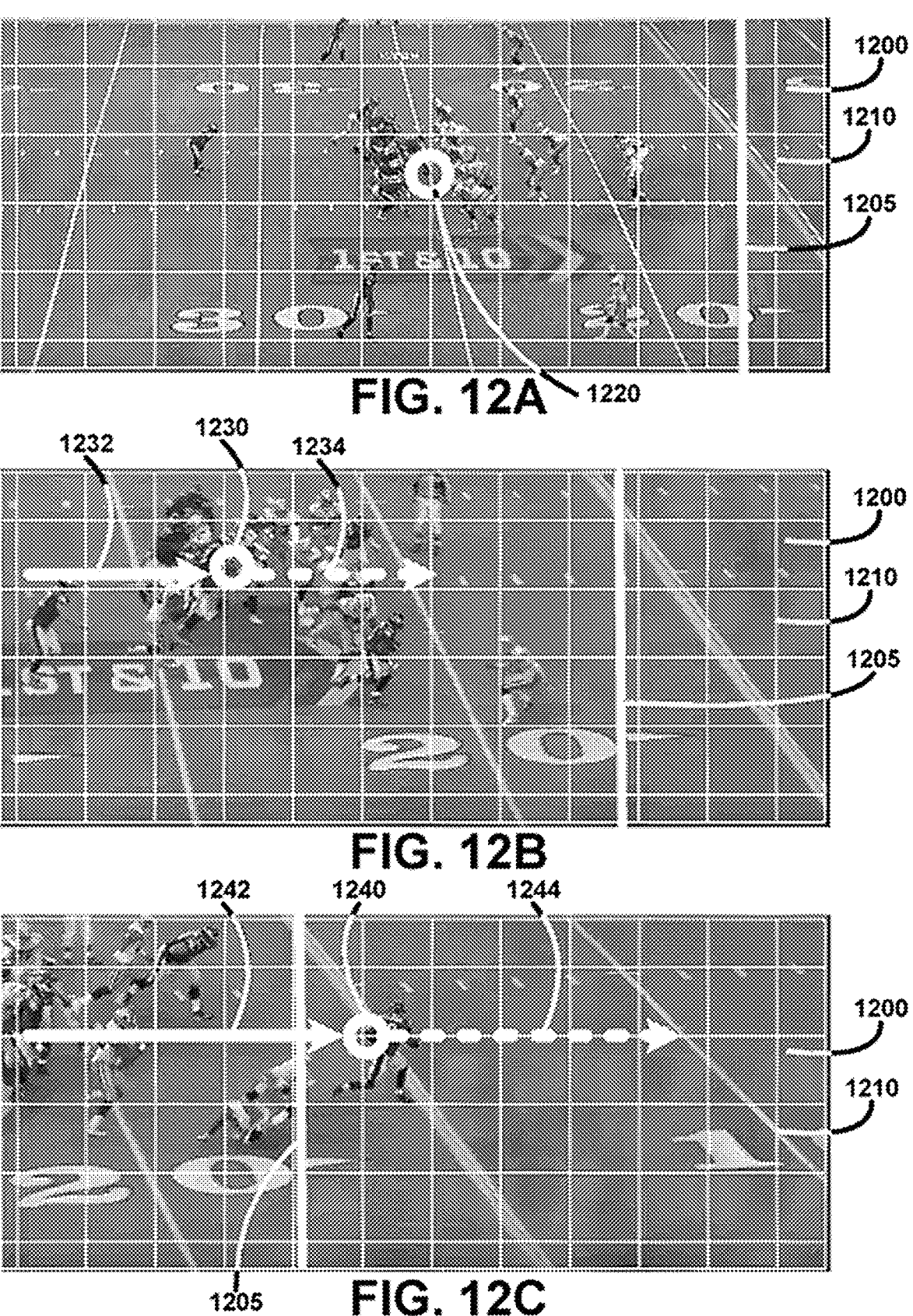
FIG. 12A shows for illustrative purposes only an example of auto cross camera first view action targeting of one embodiment.
FIG. 12B shows for illustrative purposes only an example of auto cross camera second view action targeting of one embodiment.
FIG. 12C shows for illustrative purposes only an example of auto cross camera third view action targeting of one embodiment.

FIG. 12A illustrates, for example purposes only, an embodiment of an automated cross-camera action-targeting and motion-tracking process implemented within a multi-camera AI analytics system. In this embodiment, a first video feed from camera #2 is displayed with a synchronized overlay from camera #1 1200, enabling composite analysis of the same scene from two spatial perspectives. An electronically generated reference grid 1210 is superimposed by the central network processing system 157 of FIG. 1, which is not visible to the viewer. This electronic grid 1210 serves as a motion-vector coordinate map used to determine both linear displacement and angular velocity of moving objects across successive frames. The system's digital processor 831 of FIG. 1 performs continuous optical flow analysis to calculate the relative motion of all tracked entities traversing the grid.

The grid provides both a spatial reference and a calibrated distance metric for computing the relative speed of players, officials, and equipment on the field. Each camera stream is time-aligned via metadata timestamps and depth-estimation parameters, ensuring that every grid cell corresponds to a known world-space coordinate. The processing subsystem utilizes a video-recognition component 1115 of FIG. 11, configured to execute deep-learning models for motion segmentation and trajectory inference. This model architecture may employ convolutional neural networks (CNNs) or transformer-based encoders trained on sports-specific kinematic datasets to identify object trajectories and motion continuity across multiple cameras, according to one embodiment.

The system's primary database 830 of FIG. 8, includes reference information describing common categories of sports equipment, such as footballs, baseballs, tennis balls, hockey pucks, and comparable objects of interest. Each item record includes standardized specifications-dimensions, aspect ratios, geometric shape parameters, surface reflectance properties, and typical color profiles-derived from league or governing-body regulations. These parameters allow the recognition subsystem to compare observed pixel clusters against known object templates to identify the precise object type appearing in a scene.

Using these standardized references, the video-recognition device 1115 can download or access the appropriate object model corresponding to the detected sporting context. The processor then scans incoming video frames from each active camera to identify and localize the object whose detected shape and color distribution match the stored template. Once detected, the system assigns a persistent object identifier and begins continuous tracking of the object's motion vector and orientation across the reference grid 1210.

The recognition system 1115, of FIG. 11 operating in conjunction with the digital processor 831 of FIG. 8, tracks the movement of the identified object, for example, a baseball, across the reference grid 1210. Using perspective correction and object-scale analysis, the processor performs a real-time range-finding calculation based on the apparent size of the object within the frame relative to its standardized physical dimensions. This produces a dynamic distance estimation between the object and the capturing camera. The processor may then compute a corresponding zoom-level parameter to optimize visibility of the object and its surrounding action. For instance, when an object such as a baseball moves rapidly toward the outfield and decreases in apparent size, the calculated range-finding output can trigger an automatic digital zoom to maintain focus on the relevant event region.

The system can further extrapolate the object's future trajectory using Kalman-filter-based motion prediction or recurrent neural networks (RNNs) trained for temporal path forecasting. These predictions allow the analytics engine to maintain focus continuity even during temporary occlusion of the tracked object. Once the object reappears in the field of view, its position is re-verified, and the model re-establishes its live tracking path with updated motion parameters. The projected-path data also serve as input for auto-highlight selection, ensuring that the replay or live view remains centered on the region of significant activity, according to one embodiment.

In the case of a football broadcast example, the system performs spatial correlation across adjacent camera views to align shared visual references. The position of the football on the line of scrimmage 1220 is first detected by the object-recognition system. The network server 157 of FIG. 1, in conjunction with the digital processor 831 of FIG. 8, video device 835 of FIG. 8, and OCR device 832 of FIG. 8, analyzes the video frames from both camera #1 and camera #2. The OCR device converts visible field markers-such as yard lines-into machine-readable numerical coordinates (e.g., the "20-yard line"). The video-recognition module 835 of FIG. 8, then aligns these corresponding features across both camera views.

The system computes an overlay correction factor to harmonize camera perspective and ensure geometric consistency between the two feeds. The processor 831 of FIG. 8, uses this information to adjust the spacing of the electronic grid 1210 and create a unified coordinate framework that accounts for parallax and perspective distortion. FIG. 12A shows this cross-camera matching overlay line 1205, representing the calibrated alignment of camera #1 and camera #2, superimposed upon the tracking grid 1210, according to one embodiment.

FIG. 12B illustrates, for example purposes only, a continuation of the multi-camera targeting process wherein the cross-camera tracking system dynamically updates after detecting new object positions. In this embodiment, the camera #2 view is displayed with an overlaid image from camera #1 1200, incorporating the electronic grid 1210 and alignment line 1205 from the prior configuration. The sports-equipment recognition and tracking module 822 of FIG. 8 detects and localizes the object of interest (e.g., a football 1230) at a new position, corresponding to the current terminus of the object's previous trajectory. Concurrently, the system identifies the runner carrying the object 1232 and generates a recalculated projected path and relative velocity profile.

The digital processor 831 of FIG. 8 analyzes temporal frame sequences and calculates a new motion trajectory 1234, which represents an auto-highlight selection region for subsequent playback. These recalculated vectors are used to prioritize camera feeds and pre-buffer content segments corresponding to probable high-activity events. The result is an adaptive highlight-tracking mechanism that ensures that replays remain synchronized with the most dynamic elements of gameplay, according to one embodiment.

FIG. 12C illustrates, for example purposes only, an embodiment of an extended cross-camera targeting and motion-tracking sequence. As in FIG. 12B, the composite overlay includes the camera #1 view 1200, the electronic grid 1210, and the cross-camera alignment line 1205. The tracking system identifies the carried object-such as a football held by a runner 1240—and correlates its current position 1242 with the previous path of motion calculated from earlier frames. The digital processor 831 of FIG. 8 computes a projected path and motion vector 1244, representing both the anticipated continuation of the runner's trajectory and the predicted flight path of the ball in case of a pass, fumble, or deflection.

The system dynamically updates this model in real time, refining motion predictions as new frame data are received from each camera. Each recalculated projection is stored as metadata linked to both the visual stream and the corresponding highlight index. This enables precise synchronization of multi-angle playback, automated camera prioritization, and immediate event clipping for highlight creation. By combining spatial correlation, AI-based object detection, and predictive modeling, the cross-camera tracking framework provides continuous, high-resolution coverage of fast-moving gameplay from multiple perspectives, without requiring manual camera switching or post-production editing, according to one embodiment.

Figure 13:
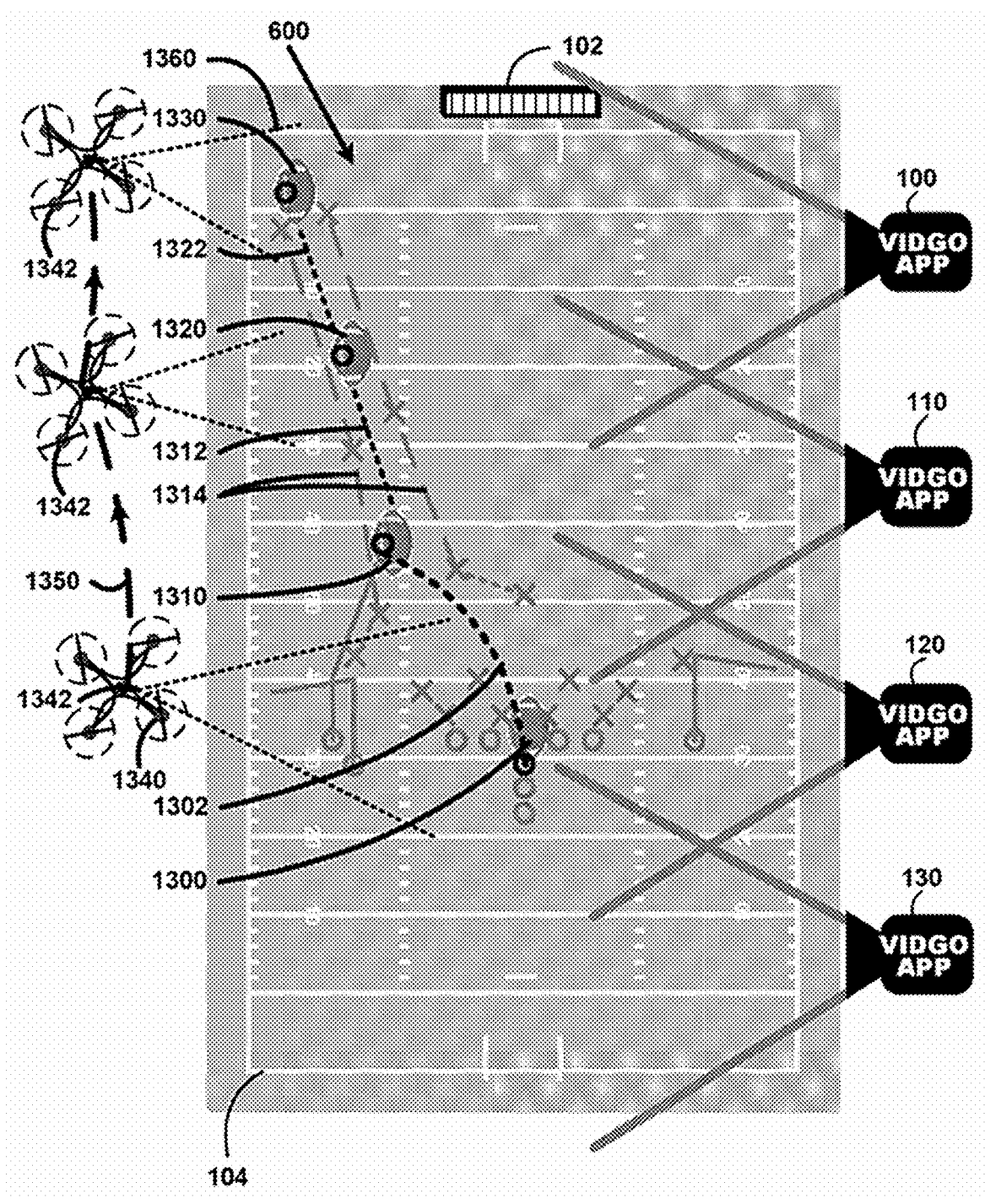
FIG. 13 shows for illustrative purposes only an example of auto drone camera streaming tracking of one embodi-ment.

FIG. 13 illustrates, for example purposes only, an embodiment of an automated drone-based video capture and AI-assisted object-tracking system integrated within a multi-camera live streaming environment. The figure depicts a sports venue, such as a football field 104, including a scoreboard 102, and multiple ground-based cameras-camera #1 100, camera #2 110, camera #3 120, and camera #4 130—each positioned along the sidelines and end zones to capture overlapping perspectives of gameplay. Two opposing teams are schematically represented in playbook format 600 for clarity of motion analysis.

In this embodiment, an autonomous aerial drone 1342 equipped with a stabilized video camera and connected to the same live-streaming platform is deployed above the playing field 1340 during the event. The drone's onboard camera feed is integrated into the centralized AI analytics and synchronization framework. The drone captures continuous aerial imagery that is transmitted wirelessly to the network processing system 157 of FIG. 1, which coordinates video alignment and event tracking across all active cameras. Using data from the sports-equipment recognition and tracking subsystem 822 of FIG. 8, the system identifies the position of the football on the line of scrimmage 1300 and tracks its movement across sequential frames.

During gameplay, the system detects that the quarterback initiates a pass 1302 to a receiver who successfully completes the catch 1310. The receiver then advances toward the end zone 1312 while defenders 1314 are pursuing. The drone 1342 receives predicted motion vectors and velocity profiles from the AI-based trajectory prediction module running on the digital processor 831 of FIG. 8, which estimates the probable path of the ball and the receiver in real time. The drone autonomously adjusts its flight pattern 1350 to maintain optimal line-of-sight and framing of the action.

The sports-equipment recognition device 822 of FIG. 9, continuously confirms the ball's position 1320, and the processor 831 of FIG. 8, recalculates path vectors 1322 as the receiver advances. Upon detecting the crossing of the goal line 1330, the drone automatically stabilizes and captures the touchdown sequence 1360 from an aerial perspective. The computing system 157 of FIG. 1 correlates the drone's footage with the ground-based cameras and stores synchronized multi-angle content within the highlight database for automated post-event generation. The digital processor 831 of FIG. 8, flags the aerial clip for inclusion in the auto-highlight sequence, marking it as an elevated viewpoint segment. This configuration provides continuous, AI-driven, drone-assisted coverage that enhances situational awareness and cinematic presentation without manual piloting or broadcast intervention, according to one embodiment.

Figure 14:
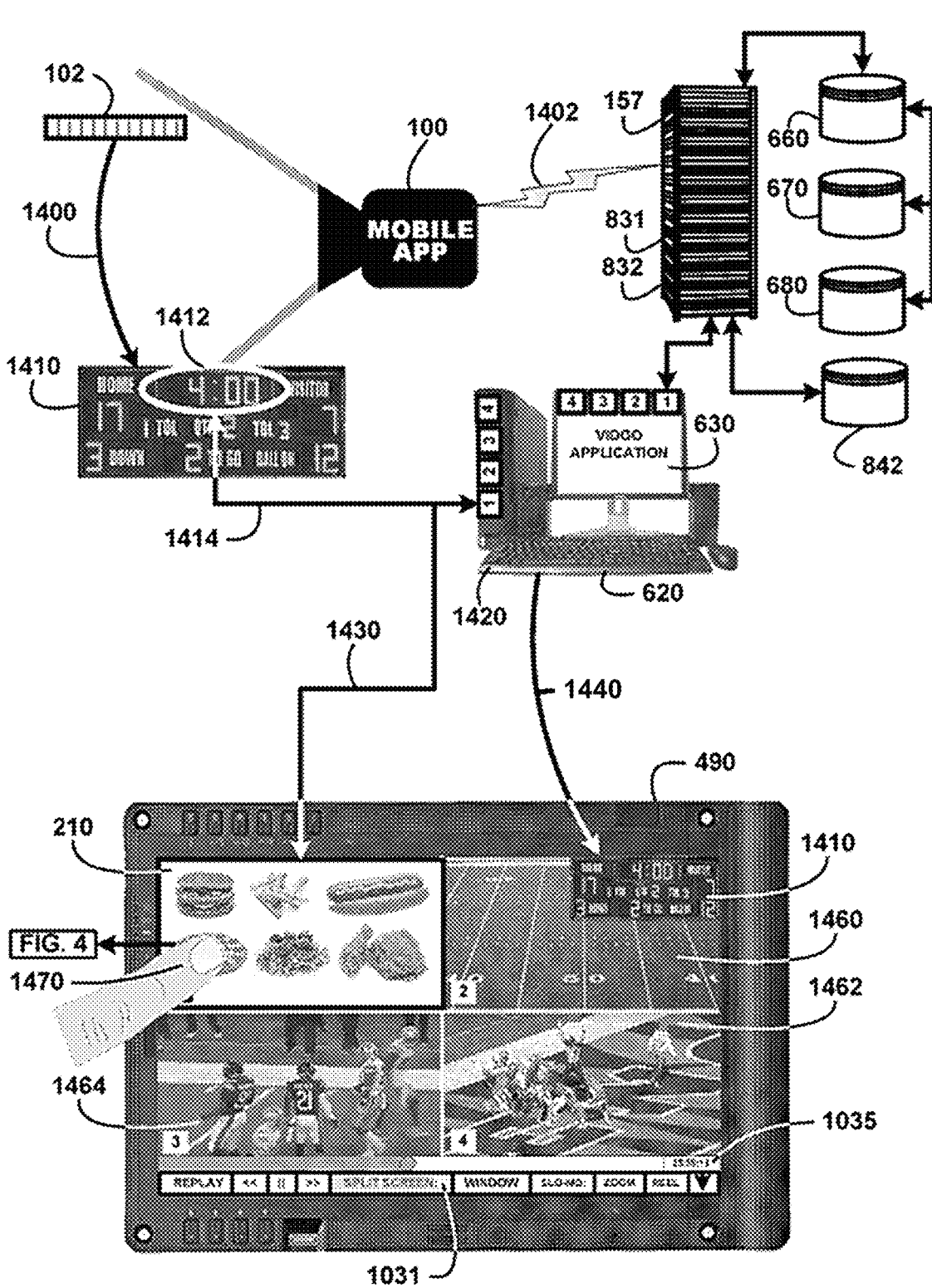
FIG. 14 shows for illustrative purposes only an example of auto ad mixing timing of one embodiment.

FIG. 14 illustrates, for example purposes only, an embodiment of an automated advertisement-timing and dynamic-content insertion system that operates in coordination with the live video streaming architecture. In this embodiment, a network of cameras—including camera #1 100—captures live video data that includes the scoreboard 102. The video streams from cameras #1 through #4 are transmitted via cellular or broadband connections to the network computer 620 having the VIDGO application 630, which is coupled to the main processing and storage system 157. The full-length recordings from cameras #3 and #4 are stored within a full-reel database 660, while auto-highlight selections from cameras #1 and #2 are stored within the first and second highlight databases 680 and 670, respectively.

The video data from camera #1 includes a captured image of the scoreboard 1400, transmitted as part of the live broadcast feed 1402. The scoreboard image 1410 contains a game clock 1412, which the system continuously monitors 1414 using optical character recognition (OCR) techniques. The OCR subsystem 832, operating in conjunction with the digital processor 831, extracts the numeric game-time data and transmits it to the control logic module 1035 responsible for event-state analysis. When the processor determines that the game clock 1412 is stopped-indicating a time-out, injury delay, or other pause in play—the system initiates an automatic split-screen layout, reserving a section of the display for dynamic advertising content.

During these stoppages, the live feeds from cameras #2, #3, and #4 (1460, 1462, 1464) remain visible within the split-screen 1031 on a user tablet 490, ensuring that the viewer retains situational awareness of the live environment. Meanwhile, the advertising subsystem accesses the advertising database 842, retrieves an ad catalog or promotional content list 1420, and presents an interactive menu overlay on the viewer's device. This menu may include categories such as local food services 1430, equipment vendors, or training promotions. A viewer may interact directly with the advertisement by tapping or selecting an item, for example, choosing a pizza icon 1470 to view local food-service partners 210 within their geographic area. Upon selection, the system initiates an integrated in-application ordering process similar to that shown in FIG. 4.

When the OCR subsystem 832 detects that the game clock 1412 has resumed running, the system automatically terminates the advertising display and returns the viewer interface to the uninterrupted live video feed 1402. This AI-driven ad-timing system ensures that commercial content is presented only during natural gameplay pauses, maximizing user engagement while maintaining broadcast continuity. The combination of real-time event-state recognition, OCR-based timing control, and contextual ad delivery provides a fully autonomous, latency-free solution for synchronized advertising insertion within live sports broadcasts, according to one embodiment.

Figure 15:
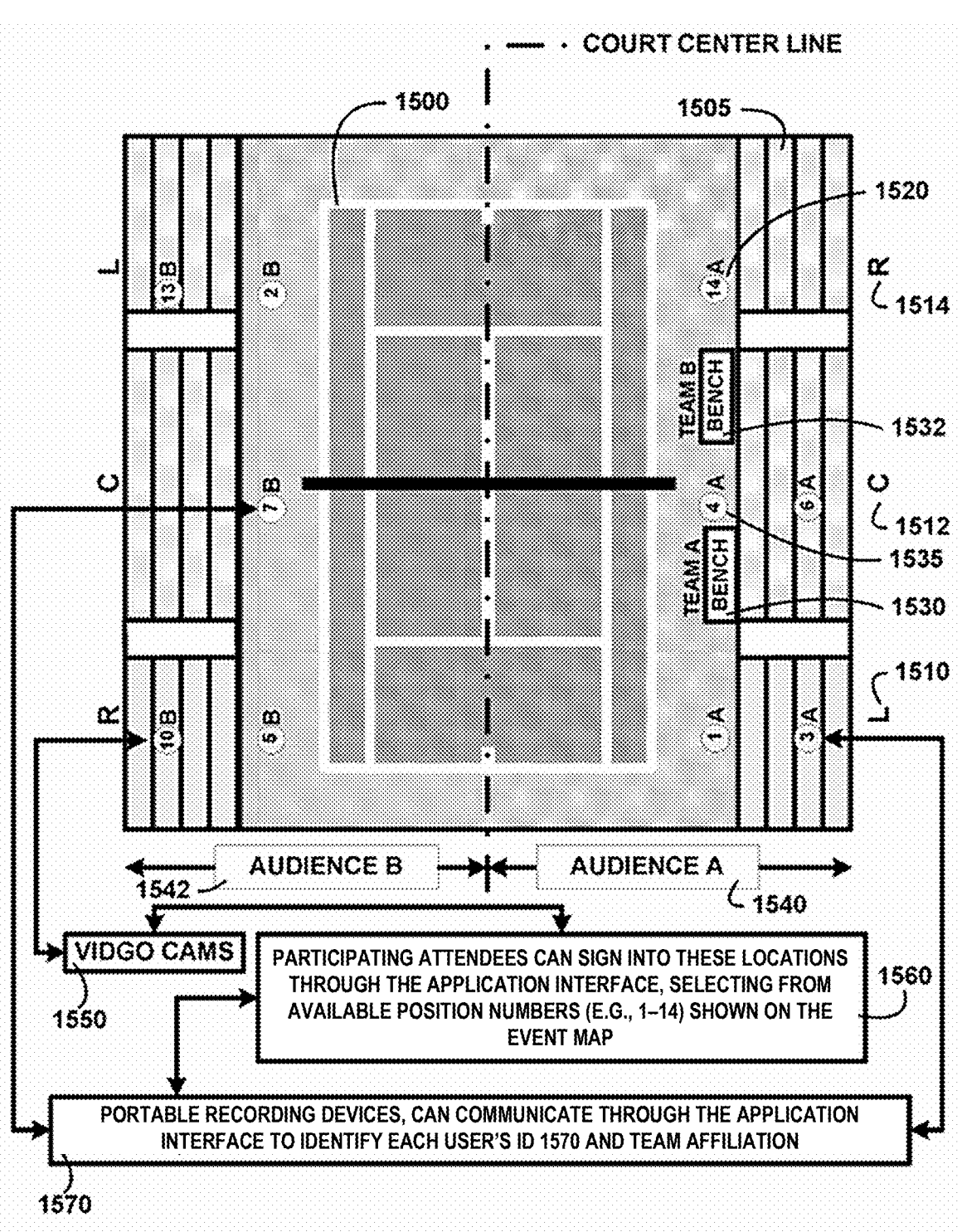
FIG. 15 shows for illustrative purposes only an example of a VIDGO cam user position selection of one embodiment.

FIG. 15 illustrates, for example purposes only, an embodiment of a distributed user camera-position selection and coordination system configured for multi-user live video coverage of a sports event or similar venue-based activity. The figure depicts an example venue, such as a tennis court 1500, including adjacent grandstands 1505 for attendees. A central network server 157 (see FIG. 1) receives live cellular video transmissions from one or more user-assigned camera positions 1520, each operating a network-connected capture application. The incoming video streams from these user camera positions 1520 are stored in at least one database 158 of FIG. 1, where they are indexed, time-stamped, and made available for synchronized broadcast assembly and later playback. This arrangement allows multiple participants to contribute real-time, spatially coordinated footage to a shared live-streaming event under automatic network management.

Prior to the start of an event, the networked application 180 of FIG. 1 configures the venue layout, establishes camera location grids, and manages participant registration for each available camera position. Users participating as camera operators may access an event selection menu, select their desired camera position 1520, and consent to allow the application to access the local device camera and transmit captured video to the network during the event. Upon registration, each user device is assigned a unique identifier (ID) associated with that event and camera location. The user also authorizes the application to determine the device's physical location using GPS or network-based triangulation, ensuring positional accuracy within the venue.

The system uses this positional data to create a unified digital venue map, wherein all participating user cameras are represented as geo-tagged nodes. During the event, users can send and receive short-range digital "pings" or notifications to coordinate coverage, signaling camera repositioning, or alerting other users to nearby action. The system may automatically categorize camera operators according to team association, location zone, or vantage point, ensuring balanced coverage of the entire playing area. This pre-event setup enables the distributed capture framework to operate autonomously once gameplay begins, according to one embodiment.

Each registered user-camera participant agrees to abide by platform-defined participation protocols and a code of conduct that ensures event integrity and safety. This code includes restrictions against entering restricted zones such as the playing area, prohibitions against disruptive or abusive behavior, and a requirement to follow official and coaching staff directives during the event. The user also agrees that captured content may be shared or redistributed for the benefit of event organizers, teams, or viewers who were unable to attend. These behavioral and technical controls are enforced through the application's event management framework, which can automatically suspend or deactivate devices that violate event policy or exceed permitted geographic bounds.

The system uses GPS or equivalent location technologies to calculate and maintain positional accuracy for each assigned camera node. The network's digital processor 642 (see FIG. 6) computes the GPS coordinates for each assigned camera position 1520 by referencing a pre-calibrated venue coordinate system derived from a venue locator or base-station GPS dataset. Each user-assigned camera position 1520 can detect and communicate with nearby camera nodes by transmitting a "ping" to the unique event ID 1570 associated with another user device. Once in position, each user's camera can broadcast its GPS coordinates to the system and display the location of other active participants within the event map.

These positional data may be visualized through the event interface, showing camera placement along venue sidelines or seating zones, updated in real time. The system can further employ proximity-based notifications to alert the event coordinator if coverage gaps arise or if certain angles remain unmanned. The continuous transmission of positional metadata ensures that all camera feeds remain geographically referenced, facilitating advanced synchronization, highlight indexing, and spatially aware replay generation, according to one embodiment.

In certain embodiments, one or more of the available camera positions 1520 may be designated as coordinator nodes 1535, granting the corresponding users additional control over event management and participant communication. The coordinator device can communicate with other camera operators, reassign coverage responsibilities, and confirm that each critical camera zone remains active throughout the event. If a participant leaves early or encounters a technical issue, the coordinator can instruct nearby operators to reposition or switch their recording orientation to maintain continuity of coverage.

Camera positions are typically arranged in designated left 1510, center 1512, and right 1514 field zones relative to the playing area. Each user camera position 1520 corresponds to a specific vantage point along the sideline or boundary of the court 1500. Participating attendees can sign into these locations through the application interface, selecting from available position numbers (e.g., 1-14) shown on the event map 1560. User cameras 1550, such as smartphones 800 of FIG. 8 or portable recording devices, can communicate through the application interface to identify each user's ID 1570 and team affiliation.

Teams may be grouped as audience "A" 1540 and audience "B" 1542, corresponding to opposing sides of the venue, with each group's camera feeds tagged accordingly. Additional positions, such as team benches 1530 and 1532, are also integrated into the coverage system. Each device transmits metadata including its camera position, assigned team, and operational status, enabling automated broadcast assembly and balanced coverage generation. This distributed user-camera framework allows for scalable, AI-assisted coordination of event coverage without requiring centralized manual control, according to one embodiment.

Figures 16A, 16B:
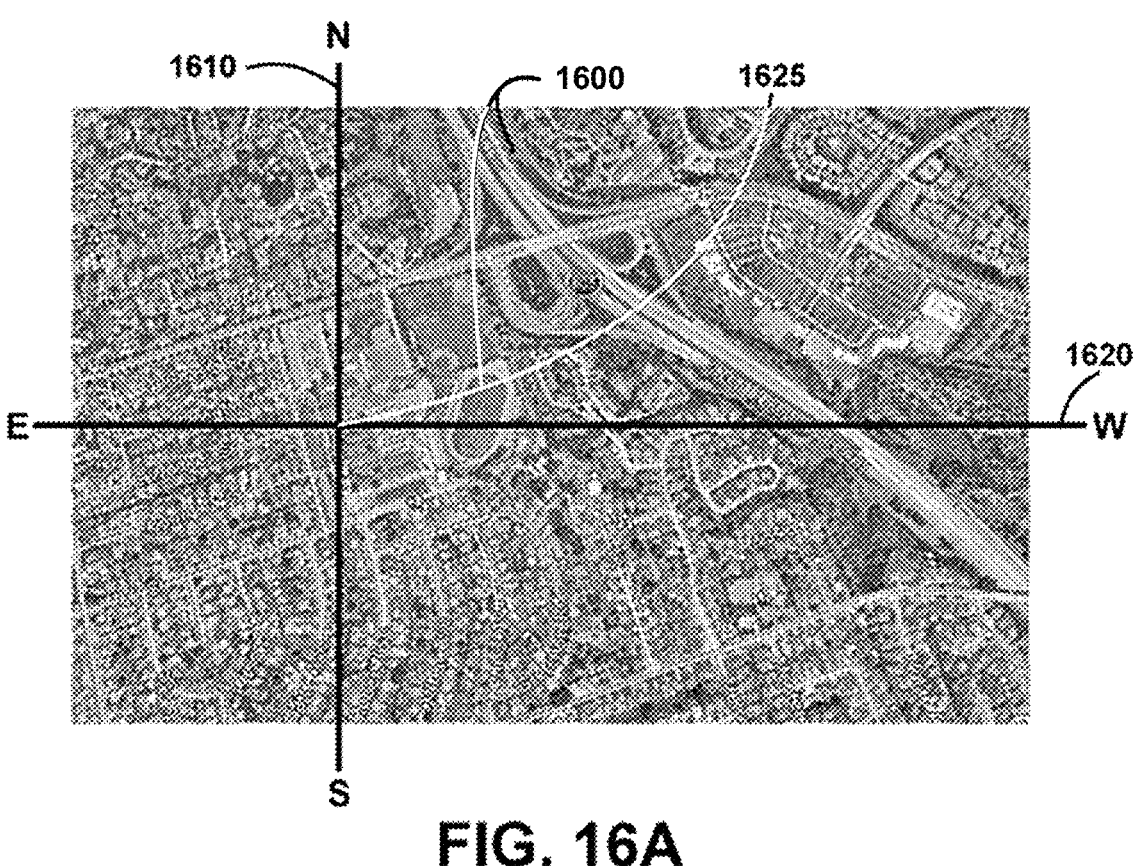
FIG. 16A shows for illustrative purposes only an example of a school location GPS search of one embodiment.
FIG. 16B shows for illustrative purposes only an example of a school sports venue locator of one embodiment.

FIG. 16A illustrates, for example purposes only, an embodiment of an automated geospatial-mapping system for identifying the location of a school or event venue using global positioning system (GPS) coordinates. The figure depicts an aerial map representation of a school property, overlaid with a first north-south longitude reference line 1610 and a first east-west latitude reference line 1620. The intersection point of these two reference axes defines a unique GPS coordinate position 1625, corresponding to the approximate geographic center of the school's main campus.

The system employs satellite-based imagery, network geolocation data, or mapping APIs to obtain high-resolution aerial images and to generate a set of reference coordinates for further analysis. The networked digital processor automatically calibrates scale and orientation parameters for each image segment, allowing downstream subsystems to search within bounded coordinate areas for identifiable sports venues or open-field structures associated with the mapped location. These coordinates serve as the foundational reference for subsequent venue detection and layout generation, according to one embodiment.

FIG. 16B illustrates, for example purposes only, an embodiment of an automated venue-detection process applied to a GPS-referenced aerial image. A localized scan of the mapped area 1600 (from FIG. 16A) is conducted using an AI-based image-recognition model trained to detect sports-field geometries, such as rectangular, oval, or diamond-shaped field outlines. The system identifies a football field 1600 within the captured region and overlays a second north-south longitude reference line 1640 and a second east-west latitude reference line 1650. The intersection point of these two lines represents a refined GPS coordinate location 1655 corresponding to the precise position of the detected sports venue.

The digital processor continuously analyzes aerial map tiles, performing pixel classification and structural pattern recognition to detect field markings, goalposts, boundary lines, and other field-specific features. These detected patterns are cross-referenced with pre-trained template libraries for football, baseball, soccer, or tennis venues. The second GPS coordinate 1655 is recorded in the system's database and serves as a reference point for the initialization of automated venue registration, camera placement modeling, and user position allocation, according to one embodiment.

Figures 17A, 17B, 17C:
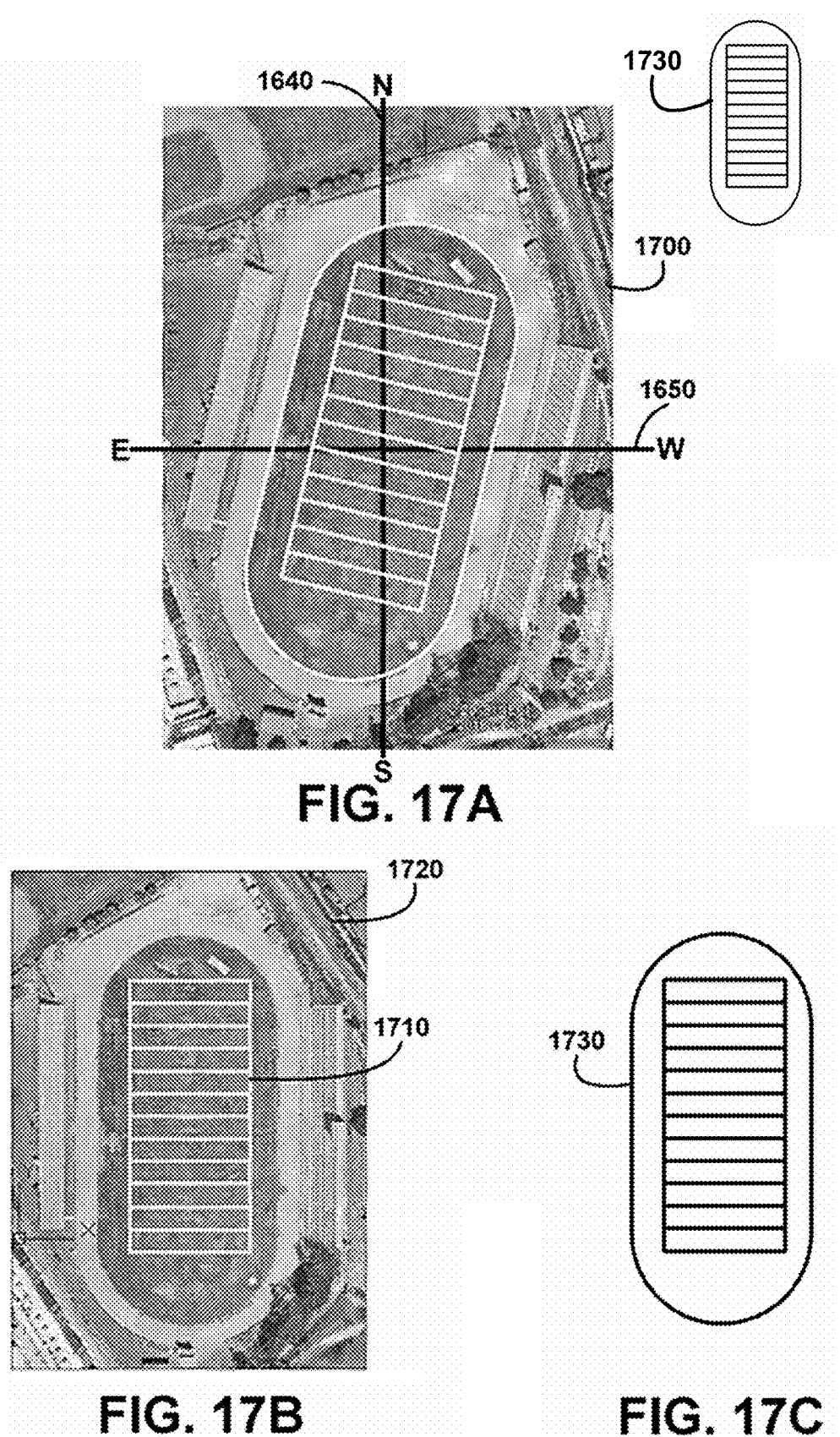
FIG. 17A shows for illustrative purposes only an example of a school football field sports venue identification of one embodiment.
FIG. 17B shows for illustrative purposes only an example of a sports venue N-S orientation of one embodiment.
FIG. 17C shows for illustrative purposes only an example of a football field sports venue recognition template of one embodiment.

FIG. 17A illustrates, for example purposes only, an embodiment of an automated sports-venue identification and template-overlay process using the previously determined GPS coordinates. The system displays a geospatial image 1700 representing the detected football field from FIG. 16B. The second north-south longitude reference line 1640 and east-west latitude reference line 1650 are used to align a venue-recognition template 1730 that includes standardized markings for yard lines, goal areas, and sideline boundaries.

The recognition template 1730 is applied as an overlay onto the aerial image using affine transformation and coordinate calibration methods. The system's image-alignment module adjusts for camera perspective, scale variance, and map projection distortion to ensure pixel-level correspondence between the real-world venue features and the template grid. Once the alignment is complete, the system displays the venue overlay and may automatically generate GPS coordinates for each designated camera or user position 1520 (see FIG. 15). This configuration enables precise virtual mapping of camera nodes and supports subsequent multi-camera network deployment for live event coverage, according to one embodiment.

FIG. 17B illustrates, for example purposes only, an embodiment of an orientation-calibration and grid-alignment process for ensuring accurate north-south venue registration. The system performs a north-south vertical realignment 1720 on the venue image 1700, using the previously determined reference axes 1640 of FIG. 17A and 1650 of FIG. 17A. The image is rotated and scaled so that the field aligns with a canonical north-south orientation standard, facilitating consistent template mapping and camera placement.

A pattern-matching algorithm compares detected field lines to the standard grid template 1710 to ensure correct geometric correspondence. Once the orientation and scaling have been verified, the system associates each active or potential camera position 1520 (see FIG. 15) with its corresponding GPS coordinates and assigns positional identifiers (e.g., left, center, right, end zone). The recalibrated, north-aligned venue map serves as the canonical coordinate reference for subsequent auto-camera registration, allowing participants or autonomous devices to select their assigned positions through the user application interface, according to one embodiment.

FIG. 17C illustrates, for example purposes only, an embodiment of a standardized sports-venue recognition template 1730, exemplified here as a football field grid used for automatic venue identification and camera placement. The template 1730 includes digitally defined yard-line intervals, boundary markings, centerline coordinates, and goal areas. When overlaid onto a captured aerial image, the recognition template serves as a spatial mask that enables the image-analysis algorithm to confirm the identity and orientation of the sports venue.

This template can also display the GPS coordinates of each active or assigned camera position 1520 of FIG. 15 derived from the system's database. Each camera node is represented as a geo-referenced anchor point within the field's coordinate system, facilitating synchronized video capture, AI-assisted coverage distribution, and automated event mapping. Once the venue alignment is confirmed, the recognition template 1730 remains active as an analytical overlay for both live broadcast calibration and event replay indexing. This ensures consistent spatial reference between multiple cameras, drone feeds, and analytics systems, thereby standardizing video capture workflows across different venues, according to one embodiment.

Figures 18A, 18B, 18C, 18D:
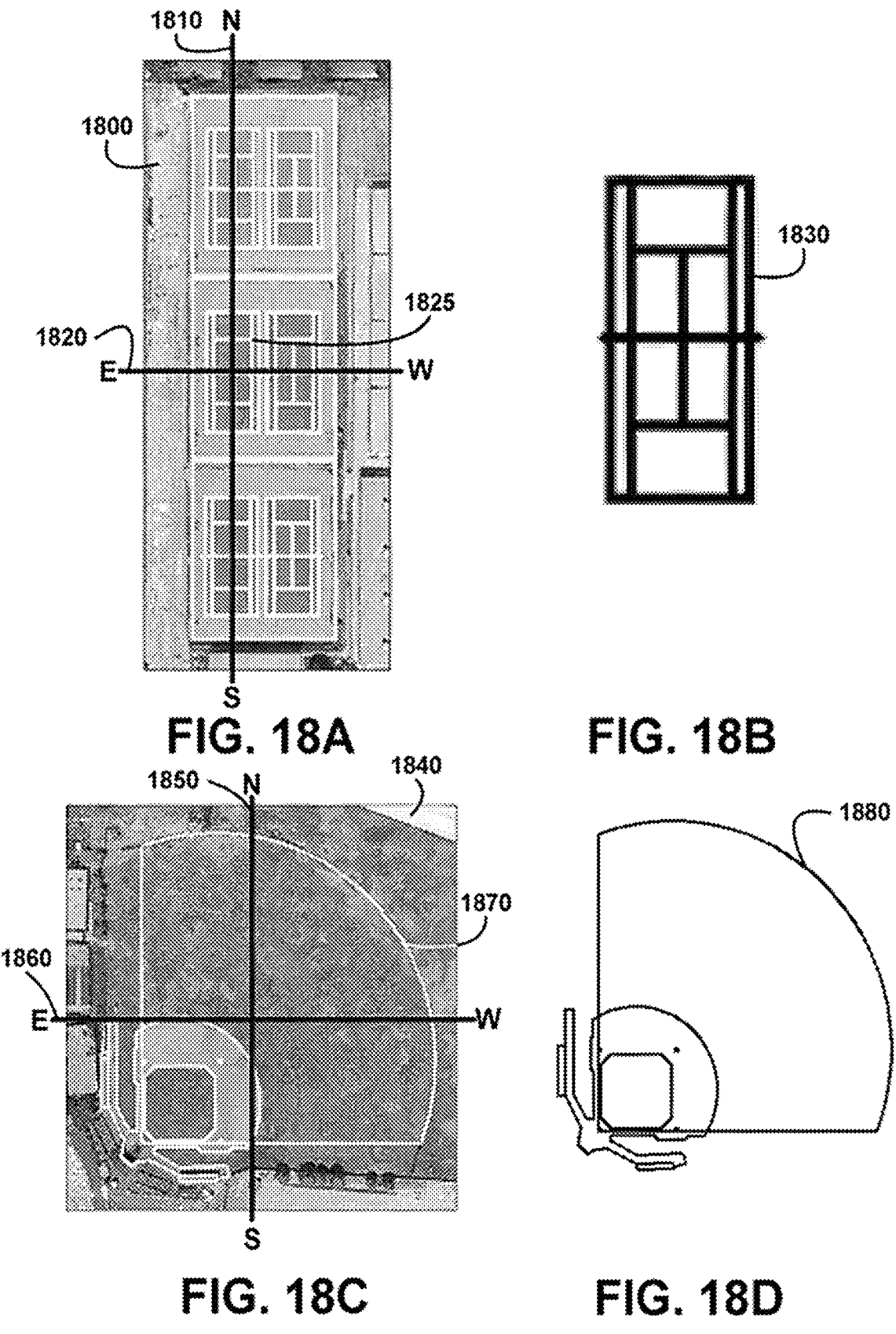
FIG. 18A shows for illustrative purposes only an example of a school tennis sports venue locator of one embodiment.
FIG. 18B shows for illustrative purposes only an example of a tennis court sports venue recognition template of one embodiment.
FIG. 18C shows for illustrative purposes only an example of a school baseball sports venue locator of one embodi-ment.
FIG. 18D shows for illustrative purposes only an example of a baseball field sports venue recognition template of one embodiment.

FIG. 18A illustrates, for example purposes only, an embodiment of an automated sports venue locator system configured to identify tennis facilities from aerial or satellite imagery using GPS-based positioning and recognition templates. The figure depicts a vertically oriented aerial image 1800 corresponding to a school or community tennis complex. The system overlays a tennis court north-south longitude reference line 1810 and an east-west latitude reference line 1820 to establish geospatial orientation. The image processing subsystem aligns these coordinates with a stored tennis court recognition template 1825, performing line detection and feature matching to identify court boundaries, service boxes, and net positions. Using this alignment, the system confirms the presence of one or more tennis courts within the scanned area and generates precise GPS coordinates for each identified playing surface. These coordinate sets are stored and later used for automated camera placement, live event mapping, or AI-based coverage scheduling according to one embodiment.

FIG. 18B illustrates, for example purposes only, an embodiment of a tennis court recognition template 1830 used for automated venue identification. The template comprises a standardized geometric representation of a regulation tennis court, including baseline, sideline, centerline, and service box dimensions in accordance with official measurements. When overlaid onto aerial or drone captured imagery, the system applies edge detection and contour matching algorithms to align the template with detected line features in the imagery. The matching process uses computer vision techniques such as line transformation, gradient magnitude analysis, and geometric projection to achieve subpixel alignment accuracy. Once the alignment confidence exceeds a predetermined threshold, the system confirms venue classification as a tennis court and associates the detected GPS location with a venue type label in the database. The recognition template 1830 can be reused for automated alignment during real time drone reconnaissance or pre-event mapping for coverage planning according to one embodiment.

FIG. 18C illustrates, for example purposes only, an embodiment of a baseball field detection process integrated into the same automated mapping framework. The system processes an aerial map 1840 of a school campus that has been vertically oriented relative to true north. A baseball field is detected within the scanned region, and the system overlays a north south longitude reference line 1850 and an east west latitude reference line 1860 to generate geospatial alignment. Using stored pattern libraries and structural templates, the processor identifies distinctive field features such as the infield diamond, pitcher's mound, baselines, and outfield curvature. These features are cross referenced against a baseball field recognition template 1870 to confirm geometric correspondence. The computer vision models trained on multisport datasets may also be employed to distinguish between baseball, softball, and multipurpose fields. Once validated, the system records the GPS coordinate centroid and orientation vectors for the venue, allowing downstream modules to position cameras or assign user capture zones relative to the field layout. The resulting GPS-anchored metadata form a persistent spatial index for automated event management and camera calibration according to one embodiment.

FIG. 18D illustrates, for example purposes only, an embodiment of a standardized baseball field recognition template 1880 used for venue classification and mapping. The template includes the infield diamond geometry, pitcher's mound radius, foul lines, outfield arc, and base positions represented as vectorized coordinates normalized to real-world scale. The system overlays this template onto the detected aerial imagery and applies adaptive scaling and rotational alignment to achieve the best fit match. Using correlation analysis between detected field contours and the stored template features, the model confirms field classification confidence and determines the orientation angle of the diamond relative to north. This information is transmitted to the venue database subsystem, which updates the field's coordinates, field type, and alignment data for use in subsequent analytics or live stream positioning routines. The standardized template structure allows for cross-sport modularity, enabling automatic recognition of multiple venue types within the same mapping framework, according to one embodiment.

Figure 19:
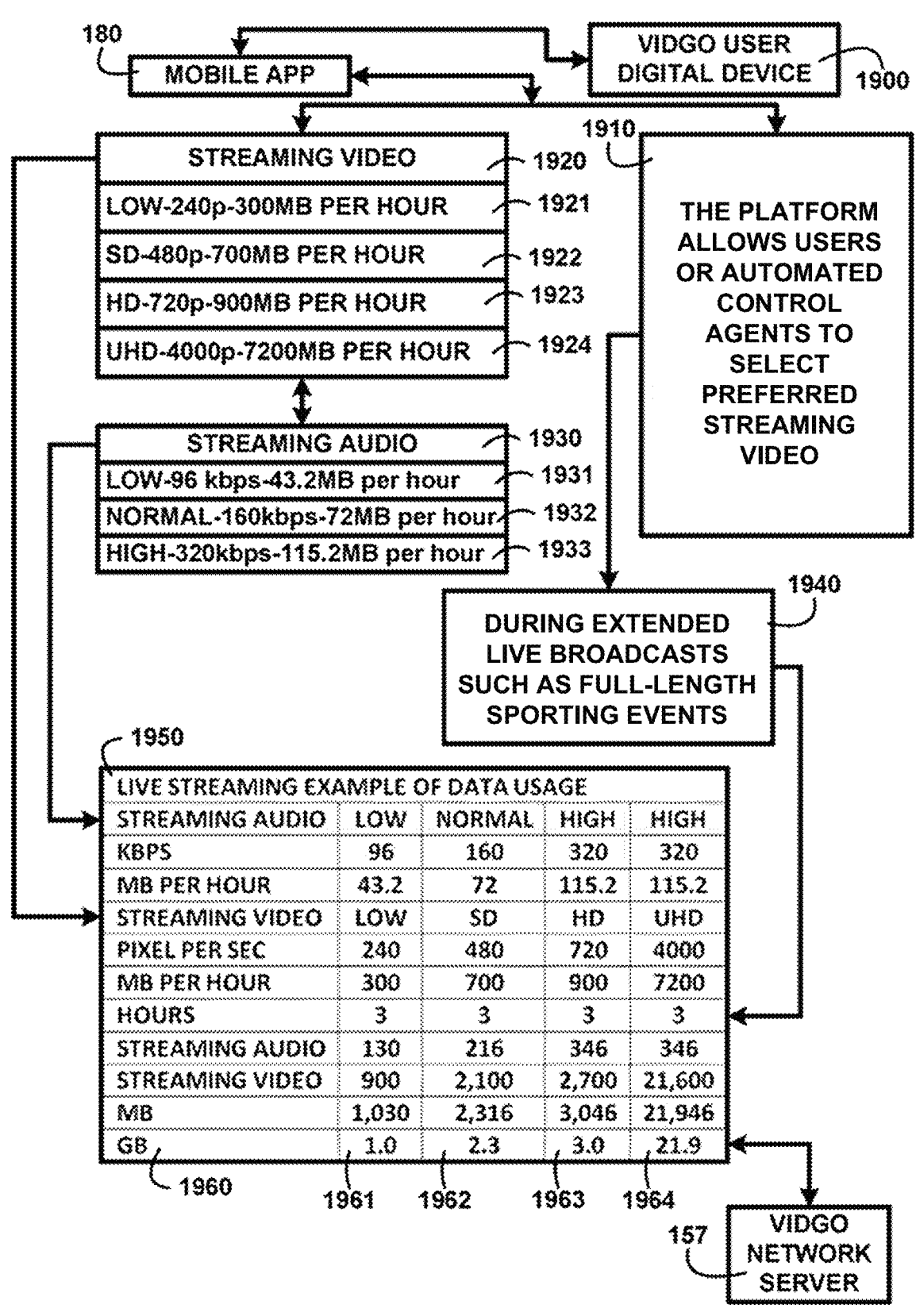
FIG. 19 illustrates an adaptive streaming and data man-agement system that dynamically optimizes bandwidth, resolution, and encoding for real-time broadcasts while supporting AI driven avatar generation and mixed reality experiences.

FIG. 19 illustrates, for example purposes only, an embodiment of an adaptive streaming and data management framework integrated within a real-time live streaming platform. A user operating a networked VIDGO user digital device 1900, such as a smartphone, tablet, or camera, may capture and transmit live video footage of a sporting event while maintaining concurrent device operations, for example, receiving calls or using a wireless headset 1910 to maintain stable camera orientation and uninterrupted audio capture. The system continuously monitors available network bandwidth, device throughput, and processor load to dynamically optimize streaming performance according to user preferences, device capability, and real-time network conditions.

The data management subsystem includes an adaptive encoding engine that supports a range of streaming resolutions and formats, extending from standard and high-definition through ultra-high definition, 8K resolutions and above. The encoding engine employs scalable video coding, perceptual compression, and AI-assisted rendering to maintain image fidelity while minimizing network congestion. The platform allows users or automated control agents to select preferred streaming video 1920 and streaming audio 1930 profiles, which may include options for low-bandwidth operation, broadcast-quality transmission, or full volumetric capture suitable for immersive mixed reality and digital twin environments.

In certain embodiments, the platform's streaming architecture supports real-time avatar conversion of the athletes or participants captured within the video stream. The avatar generation engine receives the live camera feeds, and processes them through an AI-driven reconstruction pipeline that performs depth estimation, skeletal pose tracking, and facial feature mapping to produce three-dimensional animated avatars of the live players and game officials. These avatars replicate the precise movements, gestures, and interactions of the players on the field in real-time.

The system renders these digital avatars using high-performance inference models that create stylized or photorealistic representations depending on broadcast mode. The avatar data can be transmitted as lightweight motion vectors and texture parameters, significantly reducing bandwidth requirements compared to raw video transmission. In one embodiment, the physical video feed and the corresponding avatar scene are synchronized using shared timing metadata so that the avatar-based replay remains temporally aligned with the original live footage. This allows hybrid broadcasts combining both physical camera views and AI-rendered avatar perspectives, enhancing analytical, educational, and mixed reality applications.

During extended live broadcasts such as full-length sporting events 1940, the adaptive streaming controller dynamically manages encoding rate, frame rate, and resolution in response to latency measurements, packet loss, and variable network throughput across distribution channels. The system can automatically balance between transmitting physical video and avatar model data depending on available bandwidth. The user or event administrator may override automatic controls to lock the system to a fixed resolution or to prioritize specific output modes such as detailed avatar rendering, high fidelity video capture, or enhanced environmental imaging.

All transmitted data, including both conventional video streams and AI-generated avatar motion data, are recorded in the network storage infrastructure at their effective encoding parameters to ensure synchronized archiving and metadata integrity. The resulting dataset enables precise replay of both the original camera footage and the reconstructed avatar version of the event, preserving accurate kinematics and spatial relationships for later analytics, coaching, or spectator interaction.

The described configuration provides scalable, efficient, and immersive live streaming suitable for both professional and consumer environments. By combining AI-based motion reconstruction, adaptive encoding, and avatar-level data compression, the system achieves consistent broadcast quality across variable network infrastructures while simultaneously generating a parallel digital replica of the event in real-time. This dual-mode streaming approach enables next-generation sports broadcasting, virtual replay environments, and interactive mixed reality viewer experiences according to one embodiment.

In one embodiment, an artificial intelligence-based, multi-camera spatial-tracking and three-dimensional reconstruction system suitable for real-time broadcast, analytics, and event-classification operations is used. A plurality of cameras are strategically positioned around a sports venue, each configured to capture high-frame-rate video data with partially overlapping fields of view to ensure comprehensive spatial coverage of the playing surface. Each camera is synchronized using a global or network time protocol, enabling sub-millisecond frame alignment across all optical capture nodes. The camera streams are transmitted to a networked computing system, which executes an AI-based vision inference pipeline.

The inference pipeline performs multi-view geometry computation, photometric normalization, and spatial-pose estimation for each imaging device. Computer-vision algorithms are employed to derive depth and orientation data through techniques such as feature triangulation, epipolar line correspondence, and disparity mapping. Using these data structures, the system generates a real-time, three-dimensional coordinate model 2002 representing the movement of players, officials, and gameplay equipment throughout the field. Deep learning models-such as convolutional neural networks (CNNs), recurrent neural networks (RNNs), and transformer-based temporal encoders—may be used to segment, identify, and track entities in real-time. The resulting volumetric dataset can be rendered as a continuously updated digital twin of the event, complete with vector trajectories, velocity calculations, angular displacement, and collision analytics.

In certain embodiments, this three-dimensional reconstruction process is executed on a distributed GPU or TPU compute infrastructure, enabling real-time rendering with millisecond latency. The reconstructed model 2002 may be utilized for downstream analytics such as rule enforcement, tactical visualization, and automatic highlight tagging. The system architecture supports scalable frame batching, adaptive network compression, and asynchronous inference scheduling to maintain broadcast-grade performance across varying bandwidth and lighting conditions. This AI-driven 3D reconstruction system enables high-fidelity, real-time scene modeling suitable for advanced analytics, broadcast augmentation, or training applications, according to one embodiment.

In another embodiment, a distributed cloud orchestration architecture designed to manage AI inference workloads, video encoding, and analytics synchronization across multiple geographic regions is used. The computing system functions as a central coordination hub interfacing with a plurality of cloud-computing clusters, each equipped with GPU- or tensor-based processing resources capable of executing high-throughput inference tasks. Each cluster may operate within separate data centers or edge nodes to ensure redundancy, low-latency access, and localized processing capacity. The system supports a hybrid topology wherein edge devices perform preliminary encoding, optical flow estimation, and motion-detection inference, while the remote cloud nodes handle more computationally intensive functions such as semantic segmentation, 3D reconstruction, event recognition, and personalized content generation.

An orchestration controller supervises distributed inference sessions through containerized microservices communicating over a high-performance message bus. Each microservice is dedicated to a specific task—such as frame decoding, object recognition, player trajectory clustering, or context classification—and communicates asynchronously with the orchestration layer. The controller dynamically provides computational resources and network routes based on latency metrics, throughput levels, and user demand. Load-balancing algorithms and machine-learning-based resource schedulers may continuously optimize task distribution to maintain sub-second end-to-end latency during live broadcasts.

In some embodiments, orchestration policies may incorporate predictive scaling based on upcoming event intensity, expected viewer surges, or environmental conditions detected from telemetry data. Analytical results from each regional node are synchronized and aggregated into a global time-series database for further analysis and storage. This multi-region orchestration framework provides deterministic latency control, fault tolerance, and elastic scalability suitable for large-scale, AI-enhanced media networks. The distributed inference approach allows analytics overlays, augmented data visualization, and viewer-personalized content to be delivered in real-time across a worldwide audience, according to one embodiment.

In another embodiment, the invention includes a real-time analytics and predictive-modeling interface for evaluating and visualizing performance metrics derived from live multi-camera input data. The computing system integrates raw telemetry, spatial-tracking data, and AI inference outputs into a multi-layered analytics interface. The interface provides real-time visualization of player trajectories, equipment motion, and spatial formations, overlaid on a reconstructed two-dimensional or three-dimensional field model. An analytics display layer continuously updates calculated performance indicators such as velocity, acceleration, positional entropy, reaction time, and event probability.

The analytics dashboard is accessible via user-facing applications and through professional or administrative consoles for use by coaches, referees, broadcasters, or analysts. Underlying these visualizations are machine-learning models that interpret temporal and spatial data to produce forecasts, statistical comparisons, and performance summaries. The models may include temporal convolutional networks (TCNs), graph-based attention networks (GATs), or transformer-based encoders trained to detect emergent gameplay patterns and predict outcomes. A reinforcement-learning feedback loop may be used to continuously refine these predictions in real time based on live event data.

Visual overlays may include heat maps, predictive trajectory arcs, probability cones, and color-coded performance gradients. These analytics layers may be composited directly onto live video streams or displayed as parallel analytical dashboards. The system supports real-time synchronization between the video playback engine and the analytics pipeline, allowing users to navigate backward or forward through both the visual footage and the corresponding data model. Federated learning may be used to share aggregate training weights between remote installations without disclosing proprietary or identifying data. The resulting analytics framework enables real-time, explainable, and dynamically updating insights into event performance, strategy assessment, and post-event evaluation according to one embodiment.

In another embodiment, the present invention includes an automated highlight-generation and monetization framework integrated within the described AI analytics architecture. Multiple synchronized video streams are received by the inference pipeline, which detects gameplay events by applying motion clustering, temporal segmentation, and event-classification models. When specific triggers are satisfied-such as rapid acceleration, object impact, or collective player convergence, the relevant video segment is automatically extracted and stored as a highlight clip in a highlight database. Each highlight is indexed with metadata including event type, timestamp, camera identifiers, and computed analytics descriptors such as intensity score, positional context, or event duration.

The system may concurrently produce multiple highlight formats: long-form versions suitable for official replay and short-form "micro-moments" designed for mobile viewing or social media distribution. These clips are automatically linked to a monetization engine, which inserts contextual advertisements, sponsorship overlays, or merchandise offers using real-time relevance scoring. Ad placement and timing are controlled by AI-based optimization algorithms that assess viewer engagement metrics, content category, and temporal spacing between events. Both server-side and client-side ad insertion may be supported, depending on network bandwidth and playback environment.

In one embodiment, the monetization engine tracks user interactions such as impressions, clicks, and completed purchases, storing transactional data within a secure digital ledger. Payments and revenue distribution can be executed programmatically using smart-contract systems or other auditable frameworks. The entire workflow operates autonomously, allowing highlight content to be detected, generated, monetized, and distributed with minimal human intervention. Reinforcement-learning algorithms may be employed to adjust ad relevance and frequency dynamically to optimize viewer engagement while maintaining broadcast integrity. This event-driven, AI-managed content production and monetization ecosystem provides scalable automation for modern streaming and analytics networks, enabling synchronized storytelling, advertising efficiency, and real-time viewer interactivity according to one embodiment.

In a further embodiment, the system includes an artificial intelligence (AI)-based event detection and segmentation subsystem that operates in conjunction with the multi-camera synchronization and data management framework previously described in connection with FIGS. 6, 7A-7B, 12A-12C, and 19. The AI-based event detection subsystem utilizes trained neural network models and temporal classification algorithms to continuously analyze incoming live video streams from a plurality of cameras for the purpose of identifying, labeling, and classifying discrete moments of athletic activity in real time. The detection process extends beyond basic motion identification by correlating positional and trajectory data derived from the electronic grid calculations of FIGS. 12A-12C and the adaptive streaming control engine of FIG. 19 to determine precise initiation and termination points of individual gameplay actions.

The AI subsystem autonomously recognizes event transitions such as the moment of ball release, contact between equipment and ball, serve initiation, impact or scoring attempts, and acceleration or deceleration phases of player movement. Each detected event is automatically time-stamped and indexed with reference to the synchronized frame count maintained by the network server 157 and at least one digital processor 831 described in FIGS. 6 and 7A. The subsystem generates structured metadata for each identified event, including the event category, confidence score, player or object identification, camera source, and contextual information related to play sequence or field location. This metadata is recorded in the full reel and auto highlights databases for later retrieval, replay, or analytical processing.

The AI-based event detection subsystem thereby segments the continuous multi-camera video into discrete analytical intervals corresponding to meaningful moments of activity. These segmented intervals are cross-referenced with the real-time analytics layer of the platform to enable calculation of performance metrics such as velocity, trajectory, distance, acceleration, timing, and other derived parameters of athletic performance. The resulting data supports automated highlight creation, slow-motion replay, and context-aware advertisement insertion, providing an integrated system for intelligent live production, analysis, and post-event review that scales across different sports and levels of play.

In another embodiment, the analytics subsystem described in connection with FIGS. 6, 7A-7B, 12A-12C, and 19 further includes a data export and interoperability module configured to standardize the transmission of analytical outputs for external processing and integration with third-party systems. The module interfaces with the network server and at least one digital processor to aggregate derived performance metrics such as speed, trajectory, acceleration, distance, launch angle, and other computed parameters generated from the synchronized multi-camera feeds and any associated sensor data.

The aggregated analytical results are converted into structured, machine-readable formats that may include XML, JSON, or comma-separated value (CSV) files conforming to recognized data interchange standards. Each exported dataset may include time-stamped identifiers, camera source tags, event classifications, and metadata corresponding to the analytical intervals identified by the AI-based event detection subsystem. The exported data may further include positional coordinates, trajectory vectors, and confidence values associated with each detected object or player, enabling use by independent analytics, visualization, or modeling applications.

In one configuration, the analytics export module provides a secure application programming interface (API) that allows authorized users or external systems to query and retrieve data on a per-event, per-player, or per-session basis. The API may utilize REST or gRPC communication protocols and can be configured for real-time streaming of metrics or for periodic batch exports. The exported datasets can be directly consumed by third-party visualization dashboards, scouting and training databases, or predictive modeling platforms to support advanced performance assessment, statistical comparison, and historical record keeping.

In another configuration, exported analytical data may be stored in a cloud-based repository coupled to the network infrastructure and indexed by unique identifiers corresponding to players, teams, events, or seasons. This architecture enables longitudinal performance tracking and cross-platform interoperability without the need for proprietary conversion tools. The standardized export framework thereby ensures that the analytical outputs generated by the system can integrate seamlessly with external data ecosystems, allowing coaches, analysts, broadcasters, and other authorized entities to utilize the captured metrics for technical evaluation, strategic decision-making, and research purposes across multiple levels of play and competition.

In a further embodiment, as shown in FIG. 20, the system may include a physics inference engine configured to compute and visualize kinematic relationships derived from multi-camera video data and optional sensor inputs. The physics inference engine receives synchronized positional data streams from the object tracking and event detection subsystems described in connection with FIGS. 6, 7A-7B, 12A-12C, and 19, and applies computational models to infer motion vectors, angular momentum, acceleration, and trajectory curvature of moving objects or athletes. The engine performs vector decomposition using spatial coordinates obtained from at least two camera perspectives and may apply Kalman or particle filtering techniques to reduce noise and increase positional accuracy.

The physics inference engine further integrates sensor-based telemetry, when available, such as accelerometer, gyroscope, radar, or optical sensor data to perform multi-modal sensor fusion. Through this fusion, the engine aligns temporal and spatial data across diverse sources, creating a unified physical model of the event scene. The resulting dataset represents both two-dimensional and three-dimensional vector fields that describe the instantaneous and averaged velocity, direction, and rotational dynamics of each tracked entity.

The system may generate a graphical or numerical representation of these computed vectors in real time or during post-processing, providing quantitative metrics for speed, angular velocity, launch angle, spin rate, and linear displacement. The inference outputs may be stored in the analytics database or exported via the data interchange formats previously described for integration with external scientific, coaching, or broadcast analysis tools. The physics inference engine thus enables a high-fidelity reconstruction of athletic motion and equipment interaction, providing professional-grade kinematic analysis while remaining adaptable to varying capture environments and levels of competition.

The foregoing has described the principles, embodiments, and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims.

What is claimed is:

1. A video-based analytics system for automatically detecting, measuring, and evaluating athletic performance during a live sporting event, the system comprising:

a plurality of video cameras positioned at different physical locations and oriented at distinct vantage points of the sporting event, each camera configured to capture continuous live-motion video images of athletes participating in the live sporting event and at least one corresponding piece of sports equipment during the sporting event;

a remote computer server configured to receive and process the continuous live-motion video images, the server being further configured to generate synchronized video data streams;

a video-recognition and tracking module executed by the remote computer server and configured to analyze the synchronized video data streams to automatically identify, segment, and track the location, orientation, speed, and movement trajectory of the participating athletes and of the at least one corresponding piece of sports equipment during the sporting event as current identified, segmented and tracked data;

an analytics processor coupled to the remote computer server and configured to calculate, in real time, a projected path, speed, and a projected travel distance of the at least one corresponding piece of sports equipment during the sporting event;

a comparison processor configured to compare the current identified, segmented and tracked data to historical identified, segmented and tracked previous data of the participating athletes and of the at least one corresponding piece of sports equipment to determine quantifiable variations and differences between the current identified, segmented and tracked data and the previous data; and a software application operatively coupled to the remote computer server and configured to display to users in real time, visual and numerical representations of the projected path, speed, and a projected travel distance of the at least one corresponding piece of sports equipment, the software application being further configured to display rendered three-dimensional graphical visualizations of the athletes participating in the live sporting event and the at least one corresponding piece of sports equipment during the sporting event.

2. The video-based analytics system for automatically detecting, measuring, and evaluating athletic performance during a live sporting event of claim 1, wherein the remote computer server is further configured to temporally associate corresponding image frames from each camera with one another to enable comparative multi-view analysis of the same portion of the sporting event.

3. The video-based analytics system for automatically detecting, measuring, and evaluating athletic performance during a live sporting event of claim 1, wherein the plurality of cameras are configured to operate such that their respective captured video streams collectively provide overlapping visual coverage of the sporting event.

4. The video-based analytics system for automatically detecting, measuring, and evaluating athletic performance during a live sporting event of claim 1, wherein the video-recognition and tracking module is further configured to continuously operate across successive image frames from different cameras to maintain persistent identification of each participating athlete and the at least one piece of sports equipment during the sporting event.

5. The video-based analytics system for automatically detecting, measuring, and evaluating athletic performance during a live sporting event of claim 1, wherein the analytics processor is further configured to determine a probability of a successful play outcome based on initial trajectory and movement data of the participating athletes and the at least one corresponding piece of sports equipment.

6. The video-based analytics system for automatically detecting, measuring, and evaluating athletic performance during a live sporting event of claim 1, wherein the software application provides a user-selectable viewing interface configured to enable the user to select between different camera feeds.

7. The video-based analytics system for automatically detecting, measuring, and evaluating athletic performance during a live sporting event of claim 1, wherein the network server further comprises an artificial-intelligence-based event detection and segmentation subsystem configured to analyze live video streams from the plurality of cameras in real time to identify, label, and classify discrete moments of athletic activity, each identified event being automatically time-stamped, indexed, and stored with metadata including event type, confidence score, player or object identification, and corresponding camera source.

8. A video-based analytics system for automatically detecting, measuring, and evaluating athletic performance during a live sporting event, the system comprising:

a plurality of video cameras positioned at different physical locations and oriented at distinct vantage points of the sporting event, each camera configured to capture continuous live-motion video images of athletes participating in the live sporting event and at least one corresponding piece of sports equipment during the sporting event;

a remote computer server configured to receive and process the continuous live-motion video images, the server being further configured to generate synchronized video data streams;

a video-recognition and tracking module executed by the remote computer server and configured to analyze the synchronized video data streams to automatically identify, segment, and track the location, orientation, speed, and movement trajectory of the participating athletes and of the at least one corresponding piece of sports equipment during the sporting event;

an analytics processor coupled to the remote computer server and configured to calculate, in real time, a projected path, speed, and a projected travel distance of the at least one corresponding piece of sports equipment during the sporting event;

a software application operatively coupled to the remote computer server and configured to display to users in real time, visual and numerical representations of the projected path, speed, and a projected travel distance of the at least one corresponding piece of sports equipment, the software application being further configured to display rendered three-dimensional graphical visualizations of the athletes participating in the live sporting event and the at least one corresponding piece of sports equipment during the sporting event; and a predictive analytics module coupled to the remote computer server further comprising an artificial-intelligence-based event detection and segmentation subsystem and configured to evaluate and compare live-stream data in combination with historical sports-footage datasets stored in at least one historical-footage database coupled to the predictive analytics module to determine quantifiable variations and differences between the live-stream data and the historical sports-footage datasets.

9. The video-based analytics system for automatically detecting, measuring, and evaluating athletic performance during a live sporting event of claim 8, wherein the remote computer server is further configured to temporally associate corresponding image frames from each camera with one another to enable comparative multi-view analysis of the same portion of the sporting event.

10. The video-based analytics system for automatically detecting, measuring, and evaluating athletic performance during a live sporting event of claim 8, wherein the plurality of cameras are configured to operate such that their respective captured video streams collectively provide overlapping visual coverage of the sporting event.

11. The video-based analytics system for automatically detecting, measuring, and evaluating athletic performance during a live sporting event of claim 8, wherein the video-recognition and tracking module is further configured to continuously operate across successive image frames from different cameras to maintain persistent identification of each participating athlete and the at least one piece of sports equipment during the sporting event.

12. The video-based analytics system for automatically detecting, measuring, and evaluating athletic performance during a live sporting event of claim 8, wherein the analytics processor is further configured to determine a probability of a successful play outcome based on initial trajectory and movement data of the participating athletes and the at least one corresponding piece of sports equipment.

13. The video-based analytics system for automatically detecting, measuring, and evaluating athletic performance during a live sporting event of claim 8, wherein the software application provides a user-selectable viewing interface configured to enable the user to select between different camera feeds.

14. The video-based analytics system for automatically detecting, measuring, and evaluating athletic performance during a live sporting event of claim 8, wherein the network server further comprises an artificial-intelligence-based event detection and segmentation subsystem configured to analyze live video streams from the plurality of cameras in real time to identify, label, and classify discrete moments of athletic activity, each identified event being automatically time-stamped, indexed, and stored with metadata including event type, confidence score, player or object identification, and corresponding camera source.

15. A video-based analytics system for automatically detecting, measuring, and evaluating athletic performance during a live sporting event, the system comprising:

a plurality of video cameras positioned at different physical locations and oriented at distinct vantage points of the sporting event, each camera configured to capture continuous live-motion video images of athletes participating in the live sporting event and at least one corresponding piece of sports equipment during the sporting event;

a remote computer server configured to receive and process the continuous live-motion video images, the server being further configured to generate synchronized video data streams;

a video-recognition and tracking module executed by the remote computer server and configured to analyze the synchronized video data streams to automatically identify, segment, and track the location, orientation, speed, and movement trajectory of the participating athletes and of the at least one corresponding piece of sports equipment during the sporting event;

an analytics processor coupled to the remote computer server and configured to calculate, in real time, a projected path, speed, and a projected travel distance of the at least one corresponding piece of sports equipment during the sporting event;

a software application operatively coupled to the remote computer server and configured to display to users in real time, visual and numerical representations of the projected path, speed, and a projected travel distance of the at least one corresponding piece of sports equipment, the software application being further configured to display rendered three-dimensional graphical visualizations of the athletes participating in the live sporting event and the at least one corresponding piece of sports equipment during the sporting event;

a predictive analytics module coupled to the remote computer server further comprising an artificial-intelligence-based event detection and segmentation subsystem and configured to evaluate live-stream data in combination with historical sports-footage datasets stored in at least one historical-footage database coupled to the predictive analytics module to determine quantifiable variations and differences between the live-stream data and the historical sports-footage datasets; and wherein the predictive analytics module is further configured to employ trained neural-network models to compare detected motion vectors, player formations, and event sequences against previously analyzed game-play patterns to forecast probable upcoming actions and generate contextual playback recommendations synchronized with the live broadcast.

16. The video-based analytics system for automatically detecting, measuring, and evaluating athletic performance during a live sporting event of claim 15, wherein the remote computer server is further configured to temporally associate corresponding image frames from each camera with one another to enable comparative multi-view analysis of the same portion of the sporting event.

17. The video-based analytics system for automatically detecting, measuring, and evaluating athletic performance during a live sporting event of claim 15, wherein the plurality of cameras are configured to operate such that their respective captured video streams collectively provide overlapping visual coverage of the sporting event.

18. The video-based analytics system for automatically detecting, measuring, and evaluating athletic performance during a live sporting event of claim 15, wherein the video-recognition and tracking module is further configured to continuously operate across successive image frames from different cameras to maintain persistent identification of each participating athlete and the at least one piece of sports equipment during the sporting event.

19. The video-based analytics system for automatically detecting, measuring, and evaluating athletic performance during a live sporting event of claim 15, wherein the analytics processor is further configured to determine a probability of a successful play outcome based on initial trajectory and movement data of the participating athletes and the at least one corresponding piece of sports equipment.

20. The video-based analytics system for automatically detecting, measuring, and evaluating athletic performance during a live sporting event of claim 15, wherein the software application provides a user-selectable viewing interface configured to enable the user to select between different camera feeds.

\* \* \* \* \*